(12) United States Patent
Sohm

(10) Patent No.: US 7,260,148 B2  
(45) Date of Patent: Aug. 21, 2007

(54) METHOD FOR MOTION VECTOR ESTIMATION

(75) Inventor: Oliver P. Sohm, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 914 days.

(21) Appl. No.: 10/238,534

(22) Filed: Sep. 10, 2002

(65) Prior Publication Data

US 2003/0072374 A1   Apr. 17, 2003

(30) Foreign Application Priority Data

Sep. 10, 2001   (EP) ................... 01402335

(51) Int. Cl.
    *H04N 7/12*   (2006.01)
(52) U.S. Cl. ............. 375/240.16; 348/416.1
(58) Field of Classification Search ........... 348/416, 348/402, 407, 409; 375/240.16, 240.12, 375/240.08, 240.13, 240.17, 240.24; 382/232, 382/236, 238

See application file for complete search history.

(56) References Cited

U.S. PATENT DOCUMENTS

| | | | | |
|---|---|---|---|---|
| 5,717,463 | A * | 2/1998 | Brailean et al. | 348/416 |
| 5,751,362 | A * | 5/1998 | Lee | 348/416 |
| 6,195,389 | B1 * | 2/2001 | Rodriguez et al. | 375/240.16 |
| 6,842,483 | B1 * | 1/2005 | Au et al. | 375/240.16 |

OTHER PUBLICATIONS

Shan Zhu, et al.; *A New Diamond Search Algorithm for Fast Block Matching Motion Estimation*, ICICS '97, Singapore, Sep. 9-12, 1997, pp. 292-296.

Bing Zeng, et al.; *Optimization of Fast Block Motion Estimation Algorithms*, IEEE Transactions on Circuits and Systems for Video Technology, vol. 7, No. 6, Dec. 1997, pp. 833-844.

Chaur-Heh Hsieh, et al.; *Motion Estimation Using Interblock Correlation*, IEEE Int'l Symposium on Circuits and Systems, New York, 1990, vol. 2, pp. 995-998.

M. Al-Mualla, et al.; *Simple Minimization for Fast Block Matching Motion Estimation*, Electronic Letters, 1998, vol. 34, No. 4, pp. 351-352.

(Continued)

*Primary Examiner*—Mehrdad Dastouri  
*Assistant Examiner*—Behrooz Senfi  
(74) *Attorney, Agent, or Firm*—Robert D. Marshall, Jr.; W. James Brady; Frederick J. Telecky, Jr.

(57) ABSTRACT

A method and apparatus for encoding video includes selecting a prediction motion vector for a current block of a current image frame from respective motion vectors of two or more neighbor blocks of the current block. Then the current block and a neighbor block corresponding to said prediction motion vector are checked to determine whether they are motion correlated. Checking motion correlation includes determining that the difference between the best correlation from the correlation of the current block with one or more neighbor blocks and the correlation of the neighbor block with a block in the previous image frame at a location defined by the prediction motion vector fulfils a predetermined criterion.

7 Claims, 14 Drawing Sheets

OTHER PUBLICATIONS

Jaswant R. Jain, et al.; *Displacement Measurement and Its Application in Interframe Image Coding*, IEEE Transactions on Communications, vol. Com-29, No. 12, Dec. 1981, pp. 1799-1808.

T. Koga, et al.; *Motion-Compensated Interframe Coding for Video Conferencing*, IEEE Transactions on Circuits and Systems, 1981, pp. 5.3.1-5.3.5.

Alexis M. Tourapis, et al.; *Status Report of Core Experiment on Fast Block-Matching Motion Estimation Using Diamond Zonal Search With Embedded Radar*, Tech Report ISO/IEC JTC/SC29/WG11 MPEG99/M4917, Jul. 1999, pp. 1-15.

Sang-Gon Park, et al.; *Fast Adaptive Diamond Search Algorithm for Block-Matching Motion Estimation Using Spatial Correlation*, Visual Communications and Image Processing 2001, San Jose, CA Jan. 24-26, 2001, vol. 4310, Proc. of the SPIE—Int'l Society for Optical Engineering, 2000, SPIE-Int. Soc. Opt. Eng., USA, pp. 363-371.

S. Zhu, et al.; *A New Diamond Search Algorithm for Fast Block-Matching Motion Esimation*, IEEE Transactions on Image Processing, IEEE Inc., New York, US, vol. 9, No. 2, Feb. 2000, pp. 287-290.

I. Ismaeil, et al.; *Efficient Motion Estimation Using Spatial and Temporal Motion Vector Prediction*, Image Processing, 1999, ICIP 99, ,Processings 1999 Int'l Conf. on KOBE, Japan, Oct. 24-28, 1999, Piscataway, NJ, USA, Oct. 24, 1999, pp. 70-74.

M.C. Chen, et al.; *A High Accuracy Predictive Logarithmic Motion Estimation Algorithm for Video Coding*, 1995 IEEE Int'l Symposium on Circuits and Systems (ISCAS), Seattle, Apr. 30-May 3, 1995, New York, IEEE, US, vol. 1, Apr. 30, 1995, pp. 617-620.

Y-L Chan, et al.; Adaptive Multiple-Candidate Hierarchical Search for Block Matching Algorithm, Electronics Letters, IEE Stevenage, GB, vol. 31, No. 19, Sep. 14, 1995, pp. 1637-1639.

* cited by examiner

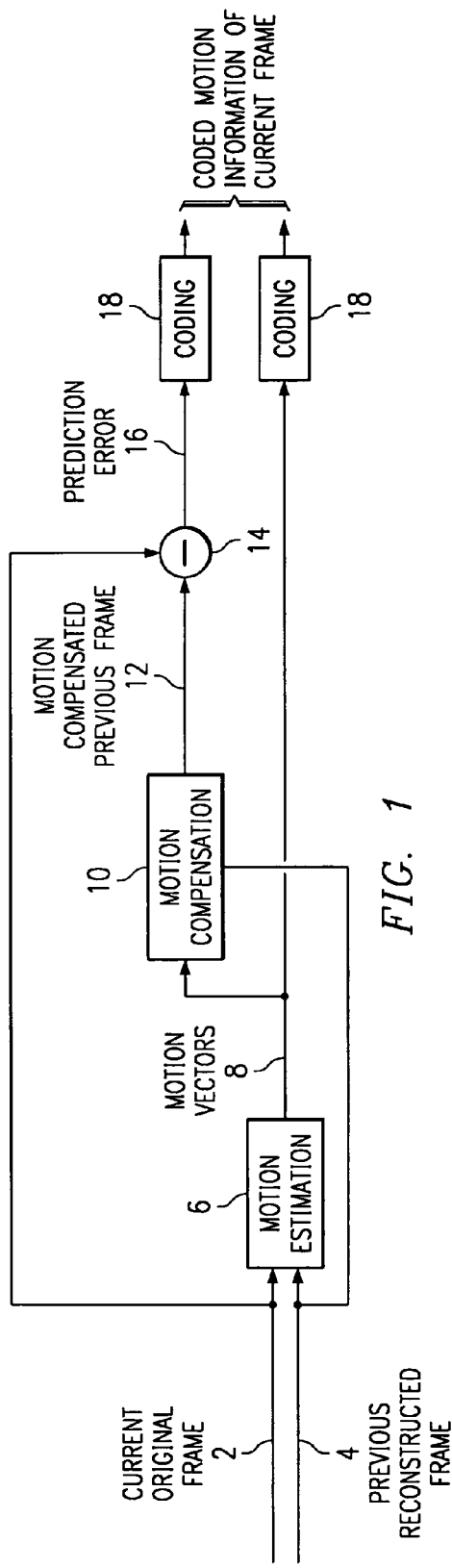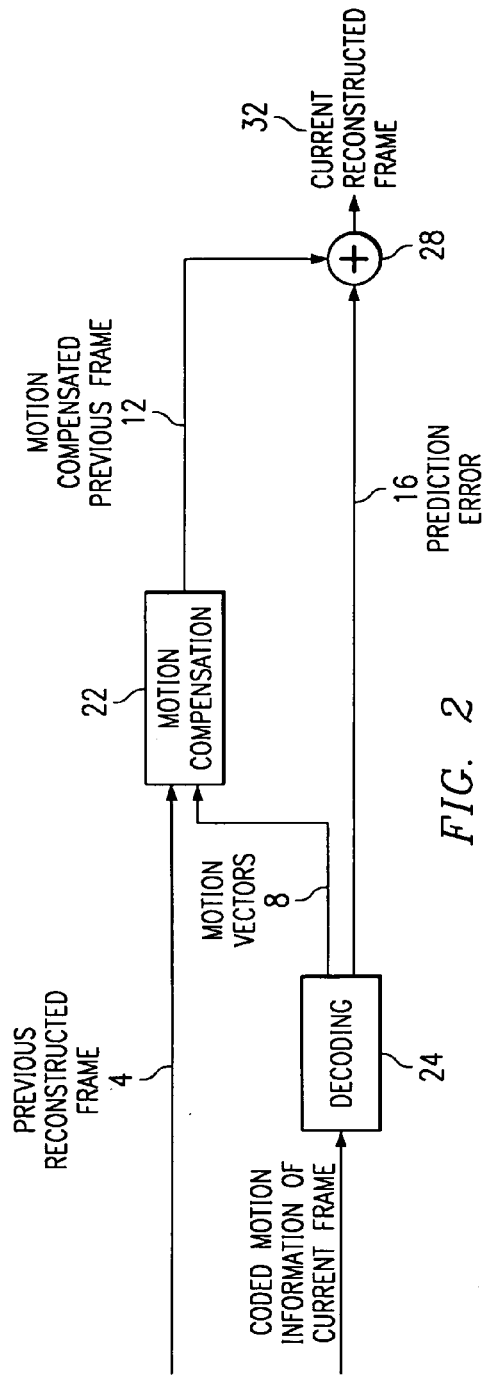

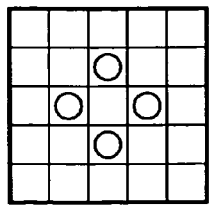

FIG. 12

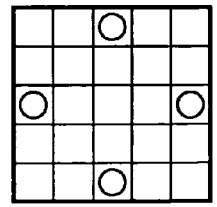

FIG. 13

| SEARCH STAGE | STEP | DESCRIPTION | PATTERN | ASSUMPTION |
|---|---|---|---|---|
| 1 PREDICTION (HIGHLY CORRELATED BLOCKS) | 1 | FIND BEST PREDICTION MOTION VECTOR AMONG NEIGHBOUR BLOCKS | ----- | BLOCK MOTION FIELD IS CORRELATED |
| | T2 | TERMINATION CRITERION: PREDICTION MOTION VECTOR FOUND ACCURATE ENOUGH? | ----- | BLOCK DISTORTION FIELD IS CORRELATED |
| 2 BASIC SEARCH FOR FAIRLY CORRELATED BLOCKS | 3 | 1-STEP CROSS SEARCH AROUND BEST PREDICTION MOTION VECTOR |  | DISTRIBUTION OF MOTION VECTOR DIFFERENCES IS DIAMOND SHAPED |
| | T4 | TERMINATION CRITERION: PREDICTION MOTION VECTOR STILL IN CENTER? | | |
| 3 EXTENDED SEARCH FOR LESS CORRELATED BLOCKS | 5 | GRADIENT DESCENT SEARCH USING ONE 1-STEP CROSS SEARCH FOLLOWED BY 2-STEP CROSS SEARCHES. STOPS WHEN BEST MOTION VECTOR IS STILL IN CENTER | | ERROR SURFACE IS UNIMODAL. DISTRIBUTION OF MOTION VECTOR DIFFERENCES IS DIAMOND SHAPED |
| | 6 | EIGHT NEIGHBOUR CHECK TO REFINE | | ----- |

FIG. 14

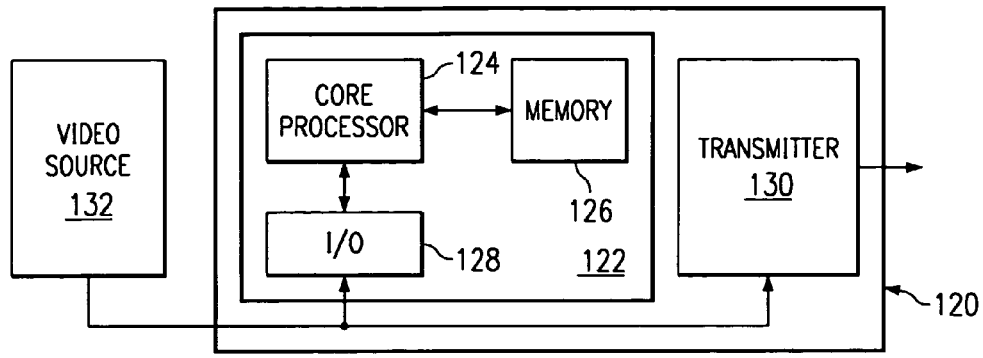

FIG. 15B

| NAME | FORMAT | SIZE | FRAMES | FRAME RATE | OBJECTS | CLASS |
|---|---|---|---|---|---|---|
| BREAM (FIG. 25) | CIF | 352x288 | 300 | 30Hz | V00: BACKGROUND<br>V01: FISH | E |
| COASTGUARD (FIG. 26) | QCIF | 176x144 | 270 | 30Hz | V00: WATER<br>V01: BIG BOAT<br>V02: SMALL BOAT<br>V03: RIVER BANK | B |
| CONTAINER SHIP (FIG. 27) | SIF | 352x240 | 161 | 30Hz | V00: WATER<br>V01: SHIP<br>V02: SMALL BOAT<br>V03: LAND (fg)<br>V04: SKY+LAND (bg)<br>V05: FLAG | A |
| NEWS (FIG. 28) | QCIF | 176x144 | 300 | 30Hz | V00: BACKGROUND<br>V01: DANCERS<br>V02: NEWS READERS<br>V03: TEXT | B |
| STEFAN (FIG. 29) | CIF | 352x288 | 300 | 30Hz | V01: STEFAN | C |

FIG. 16

| SEQUENCE | FRAME DISTANCE | MAX. VER./HOR DISPLACEMENT |
|---|---|---|
| BREAM | 2 (15 fps) | -16..15 |
| COASTGUARD | 3 (10 fps) | -16..15 |
| CONTAINER SHIP | 4 (7.5 fps) | -16..15 |
| NEWS | 3 (10 fps) | -16..15 |
| STEFAN | 1 (30 fps) | -16..15 |

FIG. 17

| WEIGHTED CBs/MB | | ALGORITHM | | | | | |
|---|---|---|---|---|---|---|---|
| SEQUENCE | OBJECT | 4PMV+0(300) | ADSZ-ER | SIMPLEX | DS | NSTEP | FS |
| BREAM | V01: FISH | 6.6 | 11.4 | 16.7 | 21.4 | 33.0 | 1,017.2 |
| BREAM TOTAL | | 6.6 | 11.4 | 16.7 | 21.4 | 33.0 | 1,017.2 |
| COASTGUARD | V00: WATER | 4.4 | 5.5 | 16.4 | 18.0 | 33.0 | 1,021.8 |
| | V02: BIG BOAT | 6.3 | 9.0 | 17.7 | 19.1 | 33.0 | 1,010.0 |
| | V03: RIVER BANK | 4.8 | 6.8 | 13.1 | 19.2 | 32.9 | 1,020.5 |
| | V01: SMALL BOAT | 5.9 | 8.5 | 16.3 | 17.5 | 32.9 | 1,004.7 |
| COASTGUARD TOTAL | | 4.9 | 6.6 | 15.5 | 18.4 | 33.0 | 1,018.1 |
| CONTAINER | V00: WATER | 1.5 | 2.5 | 12.7 | 13.1 | 33.0 | 1,023.4 |
| | V01: SHIP | 3.0 | 2.9 | 11.4 | 13.5 | 33.0 | 1,023.7 |
| | V02: SMALL BOAT | 4.3 | 3.5 | 14.7 | 15.9 | 32.9 | 1,014.3 |
| | V03: LAND (fg) | 1.1 | 1.1 | 9.4 | 13.0 | 33.0 | 1,024.0 |
| | V04: SKY+LAND (bg) | 1.3 | 1.1 | 13.9 | 15.1 | 33.0 | 1,024.0 |
| | V05: FLAG | 6.9 | 15.2 | 19.1 | 15.6 | 33.0 | 1,012.3 |
| CONTAINER TOTAL | | 1.7 | 2.2 | 12.3 | 13.2 | 33.0 | 1,023.5 |
| NEWS | V00: BACKGROUND | 1.0 | 1.0 | 9.3 | 13.0 | 33.0 | 1,024.0 |
| | V01: DANCERS | 5.6 | 8.2 | 15.4 | 16.3 | 33.0 | 1,024.0 |
| | V02: NEWS READERS | 1.7 | 1.7 | 9.8 | 13.1 | 33.0 | 1,022.9 |
| | V03: TEXT | 1.0 | 1.0 | 9.0 | 13.0 | 33.1 | 1,024.0 |
| NEWS TOTAL | | 2.1 | 2.6 | 10.6 | 13.7 | 33.0 | 1,023.6 |
| STEFAN | V01: STEFAN | 9.6 | 15.3 | 21.8 | 32.9 | 32.9 | 1,002.4 |
| STEFAN TOTAL | | 9.6 | 15.3 | 21.8 | 32.9 | 32.9 | 1,002.4 |
| GRAND TOTAL | | 4.7 | 7.3 | 15.0 | 17.6 | 33.0 | 1,018.0 |

*FIG. 18*

| SUM OF WEIGHTED MSE | | ALGORITHM | | | | | |
|---|---|---|---|---|---|---|---|
| SEQUENCE | VO | 4PMV+O(300) | ADSZ-ER | SIMPLEX | DS | NSTEP | FS |
| BREAM | VO1: FISH | 132.27 | 297.14 | 122.22 | 248.84 | 330.03 | 113.44 |
| BREAM TOTAL | | 132.27 | 297.14 | 122.22 | 248.84 | 330.03 | 113.44 |
| COASTGUARD | VO0: WATER | 52.86 | 55.66 | 49.72 | 52.20 | 56.51 | 46.90 |
| | VO1: SMALL BOAT | 177.99 | 187.15 | 154.43 | 177.60 | 170.18 | 141.32 |
| | VO2: BIG BOAT | 136.87 | 144.09 | 119.54 | 132.65 | 133.34 | 106.53 |
| | VO3: RIVER BANK | 104.02 | 110.96 | 102.83 | 112.72 | 195.28 | 98.68 |
| COASTGUARD TOTAL | | 92.80 | 98.11 | 86.27 | 94.77 | 121.20 | 80.78 |
| CONTAINER | VO0: WATER | 15.51 | 14.70 | 13.80 | 14.48 | 14.53 | 13.76 |
| | VO1: SHIP | 28.24 | 29.09 | 27.32 | 27.27 | 29.80 | 27.32 |
| | VO2: SMALL BOAT | 70.94 | 73.00 | 65.75 | 66.47 | 70.43 | 65.35 |
| | VO3: LAND (fg) | 6.43 | 6.43 | 6.36 | 6.36 | 6.35 | 6.35 |
| | VO4: SKY+LAND (bg) | 3.05 | 5.92 | 2.76 | 3.00 | 3.45 | 2.72 |
| | VO5: FLAG | 1297.73 | 1279.62 | 1235.15 | 1236.58 | 1193.78 | 1164.63 |
| CONTAINER TOTAL | | 20.86 | 21.00 | 19.42 | 19.82 | 20.20 | 19.07 |
| NEWS | VO0: BACKGROUND | 0.76 | 0.78 | 0.71 | 0.74 | 0.74 | 0.70 |
| | VO1: DANCERS | 271.42 | 307.45 | 250.54 | 259.13 | 248.85 | 222.15 |
| | VO2: NEWS READERS | 12.62 | 12.52 | 12.24 | 12.38 | 12.35 | 12.20 |
| | VO3: TEXT | 0.14 | 0.14 | 0.14 | 0.14 | 0.14 | 0.14 |
| NEWS TOTAL | | 54.85 | 61.46 | 50.84 | 52.49 | 50.58 | 45.59 |
| STEFAN | VO1: STEFAN | 381.89 | 458.44 | 330.17 | 377.32 | 372.48 | 294.39 |
| STEFAN TOTAL | | 381.89 | 458.44 | 330.17 | 377.32 | 372.48 | 294.39 |
| GRAND TOTAL | | 120.24 | 176.88 | 108.02 | 149.98 | 174.80 | 98.59 |

FIG. 19

METHOD FOR MOTION VECTOR ESTIMATION

This application claims priority from European Patent Application No. 01402335.2 filed Sep. 10, 2001.

TECHNICAL FIELD OF THE INVENTION

The present invention relates to an apparatus and method for motion vector estimation for coding video. In particular, to motion compensated video coding.

BACKGROUND OF THE INVENTION

In video coding, an original image is converted into a digital format by sampling in space and time, and by quantizing in brightness or color. The digitally formatted image comprises a sequence of image frames. Each image frame has an array of pixels, each pixel having a value corresponding to the brightness or color of the image at the point represented by the pixel. A sequence of such image frames provides a video image.

For a typical image frame comprising 1024×1024 pixels, each pixel having a value between 0 and 255, results in an image frame comprising 1 megabyte of data per image. For typical television systems, 25 images per second are displayed. Thus, the data rate for such video images is 25 megabytes per second. Such a data rate would prohibit the transmission of digital video images over most communication systems since it would require much, if not all or more, of the communication systems available data bandwidth. Consequently, the transmission of digital video images would either be prohibitively expensive or not possible, due to the data rate which the communication system needs to support in order to transmit real time video images.

However, it is well-known to encode image frames in order to reduce the amount of data necessary to represent a particular image. Examples of intra-frame coding are Run Length Coding (RLC) in which a series of identical message elements are transmitted by way of a code representing the element and the number of successive occurrences. Another form of coding is termed Variable Length Coding (VLC), sometimes known as entropy coding. This form of coding is a bit-rate reduction method based on the fact that the probability of occurrences of an element generated by a source encoded in n-bits is not the same for all elements amongst the $2^n$ different possibilities. Thus, it is advantageous to encode the most frequently used elements with less than n bits and less frequent elements with more bits, resulting in an average length that is less than the fixed length of n bits. A particular well-known method for Variable Length Coding is known as Huffmann coding.

Yet another form of coding which can be applied to images is the Discrete Cosine Transform (DCT). The Discrete Cosine Transform is a particular case of the Fourier Transform applied to discrete or sample signals which decomposes a periodic signal into a series of sine and cosine harmonic functions. The signal can then be represented by a series of coefficients of each of these functions. The image frame is a sampled bi-directional signal and has bi-dimensional DCT (horizontal and vertical) directions which transform the brightness (luminance) or color (chrominance) values of a group of pixels into another group or matrix of coefficients representing the amplitude of each of the cosine harmonic functions corresponding to each pixel. A feature of DCT coding is that the energy of a block or group of pixels is concentrated in a relatively small number of coefficients situated in the top left hand corner of the block of pixels. Additionally, these coefficients are typically decorrelated from each other. Due to the psycho-physiological aspects of human vision, i.e. a reduced sensitivity to high spatial frequencies, it is possible to eliminate coefficient values below a certain threshold function of frequency without any perceptible degradation of picture quality. The eliminated values are replaced by 0. The remaining coefficients are quantized.

In typical coding systems, DCT coding will be followed by run length coding or variable length coding in order to further compress the data necessary to represent the image.

The foregoing coding techniques are known as intra-coding techniques since the spatial content is encoded image frame-by-image frame. However, it has been observed that there is typically very little change in content between two successive frames. That is to say, the temporal correlation between two successive frames is high. The high temporal correlation between two successive frames may be utilized to reduce the amount of information needed to represent an image since only the difference between two successive frames is needed. Such coding dramatically reduces the amount of information necessary to represent an image frame and, consequently, the data rate necessary to support communication of a video image. By utilizing such coding techniques, the transmission of digital video images over many communications systems is feasible since the data rate is significantly reduced. Such a scheme can be further improved to reduce the information necessary to represent the image if the changes between two successive image frames could be predicted. Such an enhanced scheme would result in only parameters which describe predicted changes from a previous to a current frame being necessary to represent a current image. This would result in a huge reduction in information for representing the image and, consequently, result in even easier transmission of the images over communication systems. coding However, it is not possible to predict spatial content in a current frame that did not exist in a previous frame, for example previously hidden background or views of a rotating three-dimensional object may emerge in the current frame that were not visible in the previous frame. Thus, there will be a difference between a predicted current frame and the true current frame. This difference information is necessary to properly represent the current image frame. This difference is known as the prediction error. Most of the changes between two successive frames are typically caused by object or camera motion. These changes can be predicted (or estimated) by comparing the two frames and determining from which location in a previous frame a pixel has moved to in a current frame. The motion of this pixel can then be described by a motion vector. The motion vector and prediction error are all that is needed to characterize the difference between the current frame and the previous frame for that pixel. Thus, temporal correlation is exploited by estimating the motion of pixels, thereby reducing the amount of information required to encode a video image, yet maintaining a similar visual quality to that achieved by intra-coding.

SUMMARY OF THE INVENTION

In a first aspect of the present invention there is provided a method for motion estimation for encoding video, comprising selecting a prediction motion vector for a current block of a current image frame from motion vectors of two or more neighbor blocks of said current block, and checking whether said current block and a neighbor block corresponding to said prediction motion vector are motion correlated.

In accordance with a second aspect of the invention there is provided apparatus comprising a processing device configured to select a prediction motion vector for a current block of a current image frame from motion vectors of two or more neighbor blocks of said current block, and to check whether said current block and a neighbor block corresponding to said prediction motion vector are motion correlated.

Embodiments in accordance with the first and second aspects of the invention may advantageously determine whether or not a current block and a neighbor block are motion correlated. Thus, the process of motion estimation for encoding the image frames may be limited to a simple first stage relying on the correlation with neighboring blocks if the current block and neighbor block are motion correlated. The check for correlation is done with reference to a previous image frame. Otherwise, a more extensive process for motion estimation may be undertaken. Thus, the processing overhead for encoding the video can be substantially reduced for circumstances in which it is determined that the current block and enable block are motion correlated, with a more complex process used when such motion correlation is not determined. This is particularly advantageous for real time coding, and also for mobile or portable platforms utilizing such coding since reduced processing results in reduced power consumption.

BRIEF DESCRIPTION OF THE DRAWINGS

Specific embodiments of the invention will now be described, by way of example only, and with reference to the accompanying drawings, in which:

FIG. 1 is a block diagram of a motion compensated encoding scheme;

FIG. 2 is a block diagram of a motion compensated decoding scheme;

FIG. 12 illustrates a one step check block pattern for a preferred embodiment of the invention;

FIG. 13 illustrates a two-step check block pattern for a preferred embodiment of the invention;

FIG. 14 is a summary table providing an overview of a search method in accordance with a preferred embodiment of the invention;

FIG. 15B is a block diagram of an embodiment in accordance with the invention;

FIG. 16 is a table of test image sequences;

FIG. 17 is a table;

FIG. 18 is a table;

FIG. 19 is a table;

DETAILED DESCRIPTION OF PREFERRED EMBODIMENTS

Figure 3:
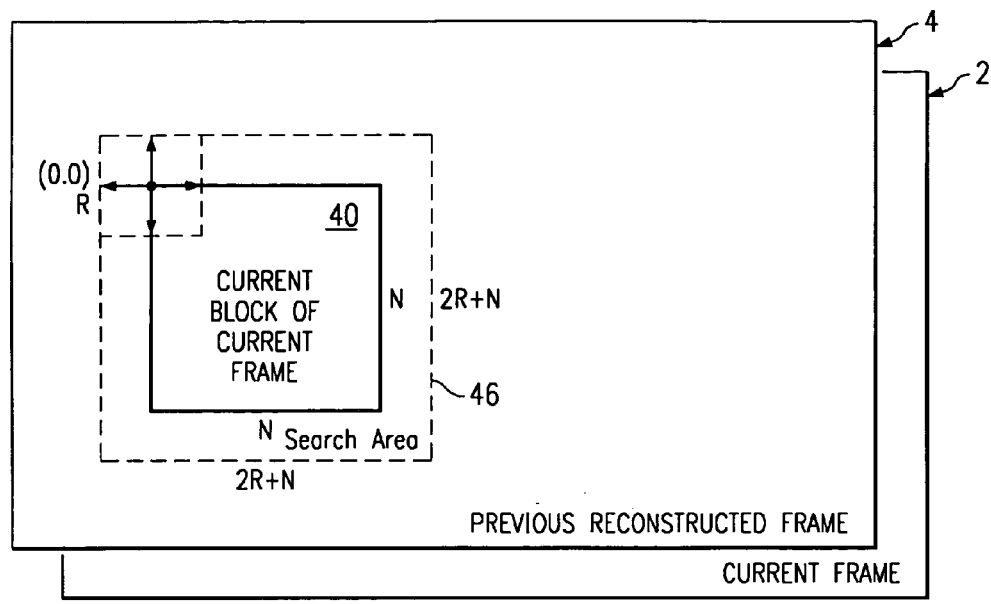
FIG. 3 is a schematic illustration of block matching between a current frame and previous reconstructed frame.

The basic principle of motion compensated video coding will now be described with reference to FIGS. 1 and 2. FIG. 1 illustrates a block diagram of motion compensated encoding circuitry. FIG. 2 illustrates a block diagram of motion compensated decoding circuitry. First, motion between the previous frame 4 and the current frame 2 is estimated in a motion estimator 6 and described through motion vectors 8. Depending on the coding scheme, motion vectors may describe the motion of individual pixels or a group (block) of pixels of a frame. Using these motion vectors, the image content of the previous frame 4 is then transformed towards the estimated new position in the current frame in motion compensation block 10 in accordance with the motion vectors 8, to form a motion compensated previous frame 12. The motion between two frames can rarely be compensated perfectly. Therefore, the motion compensated previous frame 12 is subtracted from the current original frame 2 in comparator 14 to determine the difference (prediction error) 16 of the two frames. The displaced frame difference (prediction error) 16 signal along with the motion vector information 8 is encoded in encoder 18 and transmitted to the decoder illustrated in FIG. 2. In order to reconstruct the current frame at the decoder, the contents of the previous reconstructed frame 4 are input to motion compensation block 22 and moved according to the motion vector 8 transmitted from the encoder and output from decoder block 24. The prediction error 16 transmitted to the decoder from the encoder is decoded in decoder block 24 and a prediction error signal 16 is output to adder 28. The previous reconstructed frame 4, motion compensated in accordance with motion vectors 8, is output from motion compensation block 22 as motion compensated previous frame 12. Motion compensated previous frame 12 is input to adder 28 where it is summed with the prediction error signal 16 to yield a current reconstructed frame 32.

Although the foregoing has been described in terms of frames, it will be understood by persons of ordinary skill in the art that the encoding/decoding takes place on a pixel by pixel or block by block basis. The use of the term "frame" for describing FIGS. 1 and 2 is to illustrate the encoding/decoding schemes in terms of image frames as a whole.

Video coding has to deal with moving three-dimensional objects which are projected onto a two-dimensional image plane. Assuming the objects are rigid, possible types of motion include translation, rotation and zooming. However, to keep the motion estimation process simple but efficient, the majority of algorithms have been based on a block structure and approximate all types of motion to translation. A more sophisticated global motion compensation approach tries to model motion through more complex geometric transformations. Also, there are other effects such as changes in lighting and uncovering of previously hidden background which contribute to motion. Some algorithms try to take these changes into account.

A brief description of some known motion estimation video coding schemes will now be provided.

A technique known as Pel Recursive Motion Estimation seeks to minimize the interframe prediction error of each picture element (pel) or pixel by using a recursive steepest descent algorithm. An initial estimation of a translation vector is made and improved in an iterative process. The translation vector describes the movement of a luminance value of a picture element between two successive frames. Within the iteration process, the difference between the true luminance value and the luminance value at the current estimated position is calculated. Based on this result and the gradient of the luminance (the gradient is estimated using picture elements in the neighborhood of the current estimated position) a new improved estimated translation vector is determined. As the estimated translation vector approaches its true value the luminance difference approaches zero. The final luminance difference corresponds to a motion-compensated interframe prediction error. Many modifications of this basic algorithm exist which, for example, take into account changes in illumination, improve the convergence or suggest suitable choices for the initial estimate of the translation vector. However, problems still exist regarding the correct classification of areas for which motion compensation has to be applied, suitable initial estimates and implementation.

The most popular scheme for estimating motion is Block Matching Motion Estimation (BMME) based on block matching, Reference [1], because of its simplicity. Block matching motion estimation was adopted by several video coding standards such as H.263 and MPEG-4. A block, NXN pixels, in the current frame is compared to a number of blocks in the previous frame by displacing it within a specified search area. Block matching can be seen as simple correlation technique where two image blocks are correlated with each other to minimize an error function. Other motion compensation algorithms have been developed based on a more formal definition of correlation. The advantage of those correlation techniques is that they can handle large interframe displacements.

A further coding scheme is known as Hierarchical Motion Estimation. The hierarchical block matching approach overcomes two disadvantages of the simple block matching method. The first disadvantage of BMME is that large displacements cannot be dealt with because a fixed block size is used and, second, it is not guaranteed that an estimation of the true displacement is obtained since the minimum of the error function does not necessarily correspond to the true displacement. Therefore, the motion vectors may not be very accurate. The hierarchical method starts with a large window to obtain a first estimation and then successively refines this estimate using smaller and smaller windows. Another variant of the hierarchical technique is to build an image pyramid by successively averaging the image at each level. An element by element estimation is then used from the top (smallest image) to the bottom layer. At each level, the motion vector obtained is taken as an initial estimate for the next layer. Hierarchical methods offer a simple way to extend the capabilities of block matching and fit well into the context of multi-resolution coding.

Embodiments of the present invention address the drawbacks and disadvantages of known motion estimation coding schemes.

Viewed from one perspective, an embodiment of the invention identifies predicted motion vectors for a current block from motion vectors of blocks of the current frame, and then checks the accuracy of the selected predicted motion vector with blocks in a previous frame.

Typically, selecting the prediction motion vector comprises evaluating the correlation of the current block with two or more blocks of a previous image frame at locations in the previous image frame defined by the motion vectors relative to the current block. One of the motion vectors yielding the best correlation is then selected as the prediction motion vector.

Checking whether the current block and the neighbor block are motion correlated is conducted by determining the difference between the best correlation and the correlation of the neighbor block with a block in the previous image frame at a location defined by the prediction motion vector fulfils a predetermined criterion. Such predetermined criterion may be derived by trial and error to determine what level of difference may be tolerated yet provide good encoding. That is to say, what level of motion correlation is necessary to provide good video coding.

Preferably, the predetermined criterion is defined by the relationship:

$$|\text{Correlation}_{neighbor}(PMV) - \text{Correlation}_{current}(PMV)| < \text{Threshold} \quad (1)$$

where: $\text{Correlation}_{current}(PMV)$ is the correlation of said current block with a block in said previous image frame at a location defined by said prediction motion vector; $\text{Correlation}_{neighbor}(PMV)$ is the correlation of said neighbor block with a block in said previous image frame at a location defined by said prediction motion vector; and Threshold is a threshold value for said difference between said correlations.

More specifically, the criterion may be defined by the following relationship:

$$BDM(PMV) < MBDM_{Neighbor}(PMV) + \text{Threshold} \quad (2)$$

where; $BDM(PMV)$ is the block distortion measure for the current block at PMV; $MBDM_{Neighbor}(PMV)$ is the minimum block distortion measure of the neighbor block from which PMV was taken; and Threshold is a value determined to set an accuracy level for $BDM(PMV)$.

In the foregoing relationship the BDM is representative of correlation.

If the criterion is fulfilled then the prediction motion vector is assigned to the current block as the estimated motion vector for that current block.

When the criterion is not fulfilled, the checking further comprises defining a block at a location in the previous image frame defined by the prediction motion vector as a center check block. The current block correlation with a check block in a region of said previous image frame around said center check block is compared with the current block correlation with the center check block.

Preferably, the current block correlation with two or more check blocks in the regions of said previous image frame around the center check block is compared to the current block correlation with the center check block.

Yet more preferably, the current block correlation with at least 4 check blocks in the region of said previous image frame around the center check block is compared to the current block correlation with the center check block.

If the current block correlation with the check block in the region exceeds the current block correlation with the center check block then that check block is defined as a new center check block. The current block correlation with one or more further check blocks in a region of said previous image frame around the new center check block is then compared to the current block correlation with the new center check block. Typically, the region around said new center check block comprises blocks adjacent said new center check block, and preferably at least one picture element away from the new center check block.

Preferably, the check block is defined as the new center check block if that check block has the greatest correlation with the current block out of the check blocks in the region.

If the current block correlation with the new center check block exceeds the current block correlation with the further check block, then the prediction motion vector is assigned to the current block as the estimated motion vector.

If the current block correlation with a further check block exceeds the current block correlation with the new center check block, then that further check block is defined as the new center check block, and the current block correlation with one or more yet further check blocks in an extended region of said previous image frame around the new center check block is compared to the current block correlation with the new center check block.

Typically, the extended region around the center block and/or the new center check block comprises blocks adjacent to the new center check block.

The extended region comprises blocks spaced at least two picture elements away from the new center check block.

Suitably a picture element is a pixel.

If the current block correlation with the new center check block is not exceeded by the current block correlation with a further check block, then the current block correlation with neighbor blocks of the new center check block is evaluated to determine which of the neighbor blocks and new center check block yields the best current block correlation.

Preferably, all eight-neighbor blocks are checked in order to determine which of the neighbor blocks and new center check block yields the best current block correlation. The motion vector corresponding to a neighbor block or the new center check block yielding the best current block correlation is assigned to the current block as the estimated motion vector.

Suitably, the correlation is measured by a block distortion measure, for example the sum of absolute differences, the sum of squared differences, the mean sum of absolute differences, or the mean squared error.

The blocks comprise individual pixels, and may comprise a single pixel.

In a third aspect of the invention, there is provided a method for video encoding, comprising initiating a comparison of the correlation of a current block with a center check block at a location in a previous frame defined by a motion vector for the current block with the correlation of a current block with a check block adjacent, i.e. one step (picture element) from, the center check block, and initiating a comparison of the correlation of the current block of the center check block with the correlation of the current block with the check block two steps (picture elements) from said center check block.

In a fourth aspect of the invention, computer programs for implementing, or translatable to implement, the foregoing described features are provided.

In a fifth aspect, a communications system comprising apparatus such as referred to above is provided.

In accordance with an aspect of the invention, there is provided a fast block estimation method which efficiently exploits correlation between interframe blocks and so achieves a large speed-up of the search process. A technical advantage as illustrated in test sequences is that on average the method required only about two thirds of the number of check blocks while still achieving a better mean square error (MAE) compared to the ADZS-ER algorithm, the current fastest algorithm proposed for MPEG-4. In case of complex video objects or frames which may contain a high proportion of uncorrelated blocks, the method still performs very competitively. Due to its simple structure the control flow overhead is very small, thus making it suitable for software-based codecs.

An embodiment of the invention provides a new simple block-adaptive threshold criterion for early termination of a block matching search based on the local spatial correlation of minimum block distortion measures (BDM) of neighboring blocks. Depending on this criterion, less correlated blocks are subjected to a more thorough search using a gradient descent method. Thus, the coding method disclosed herein can accurately estimate motion ranging from correlated and quasi-static to less correlated and fast. It is shown that the disclosed method requires fewer check blocks and produces a smaller mean square error (MSE) per pixel than known so-called fast algorithms. In case of complex video objects or frames, which may contain a high proportion of uncorrelated blocks, the disclosed method still performs very competitively compared to other algorithms. Due to its simple structure, the control flow overhead is very small, thus making it suitable for software-based codecs.

Particular and preferred aspects of the invention are set out in the accompanying independent claims. Combinations of features from the dependent and/or independent claims may be combined as appropriate and not merely as set out in the claims.

The crucial stages of a motion vector compensated coding scheme are motion estimation and the coding of the motion information (motion vectors and prediction error), as they determine the amount of information that has to be transmitted to the decoder. The more accurate the motion estimation process is the less the difference between the current frame and the motion compensated frame and, consequently, the less information which has to be transmitted to represent the prediction error. Similarly, intelligent coding of motion vectors, for instance through exploiting statistical properties of real world motion, can reduce the amount of motion vector information. However, to achieve the minimum required information being transmitted, prediction error and motion vector information (and possibly other overhead information) has to be carefully balanced. For instance, to achieve a low prediction error the bit requirement for the motion vectors may be very high. However, if the distribution of motion vectors is more in favor of the motion vector coding scheme, the overall bit savings may still be better compared to the previous case even if the prediction error is higher. These motion estimation schemes are called rate-optimized. Since the true bit requirement is only known after coding, it can only be estimated during the motion estimation process, otherwise the computational complexity would be excessive. Another important decision which is even more crucial is to determine whether or not prediction error and motion vector information is indeed lower than transmitting spatial information directly. This is relevant for image regions that contain a large amount of motion causing even the motion compensated difference between frames to be large.

Illustrative embodiments in accordance with the present invention and described herein are based on block matching motion estimation (BMME), which will now be described with reference to FIG. 3 of the drawings. However, the ordinarily skilled person will appreciate that the teachings disclosed herein may be applied in other ways.

To encode an image frame a block 40 in the current frame 2 is compared to a number of blocks in the previous reconstructed frame 4 by displacing block 40 within a specified search area 46 of the previous reconstructed frame 4. In the example illustrated in FIG. 3, the current block 40 of current frame 2 is NXN pixels in size. The search area 46 of previous reconstructed frame 4 is (2R+N)×(2R+N) where R is the maximum motion vector in any direction. The origin (0,0) denotes the current block being in the same position in the previous reconstructed frame 4 as it is in the current frame 2, i.e. not displaced. For each displacement, a block distortion measure (BDM) is calculated. The BDM is a measure of the correlation of the current block 40 with the block in the previous reconstructed frame at the displaced position.

Commonly used distortion measures are the mean absolute difference (MAD) or the mean square (MSE) between pixel values, e.g. luminance values, of the current block 40 and the pixel values of the block of the reconstructed frame 4 corresponding to the position of current block 40 in the search area 46. The displacement between the current block and the best matching block in the previous frame is the motion vector. The pixel luminance differences between the current block and the best matching block are the prediction error 16. Motion vector and prediction error information is then coded and transmitted to the decoder. Typically, data is coded on a block-by-block basis. Each coded block contains a motion vector and the prediction error (amongst other side information).

Referring back to FIG. 2, to reconstruct the current block 40 at the decoder, the motion vector 8 is used as an index pointer into the previous reconstructed frame 4 to obtain an estimate of the block content for the current block. The estimate is obtained in motion compensation block 22 which outputs a motion compensated previous block which is an estimate of the block content for the current block. Then the prediction error 16 is added to obtain the true block content 32.

Figure 4:
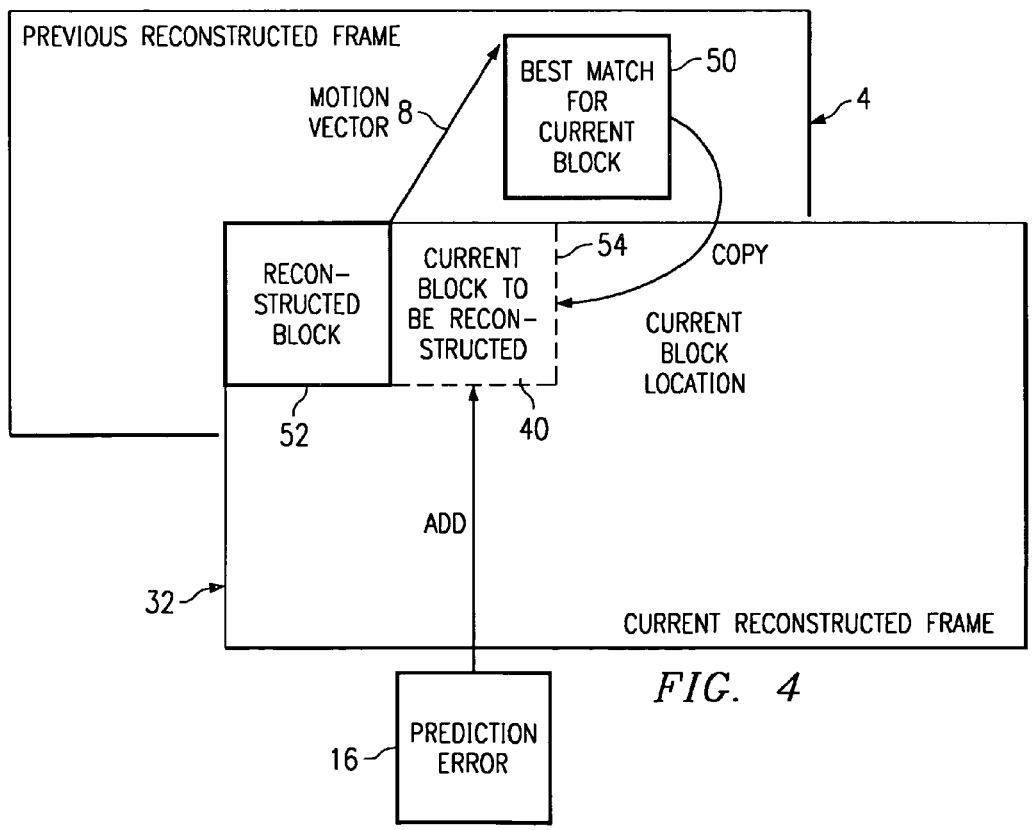
FIG. 4 is a schematic illustration of the reconstruction of a block encoded current frame at a decoder.

Referring now to FIG. 4, motion vector 8 points to the location of a best matching block 50, as determined in the encoding phase described above, in previous reconstructed frame 4 relative to the position of current block 40 in the current frame 32. A previously reconstructed block 52 is shown in the current reconstructed frame 32. The best matching block 50 has its contents 54 copied to the location of current block 40. This is analogous to motion compensation of the best matching block 50 such as described with reference to FIG. 2 above, and achieves the same result.

The prediction error 16 between block 40 and 50 is then added to the contents 54 of best matching block 50 to yield current reconstructed block 40.

Figure 5:
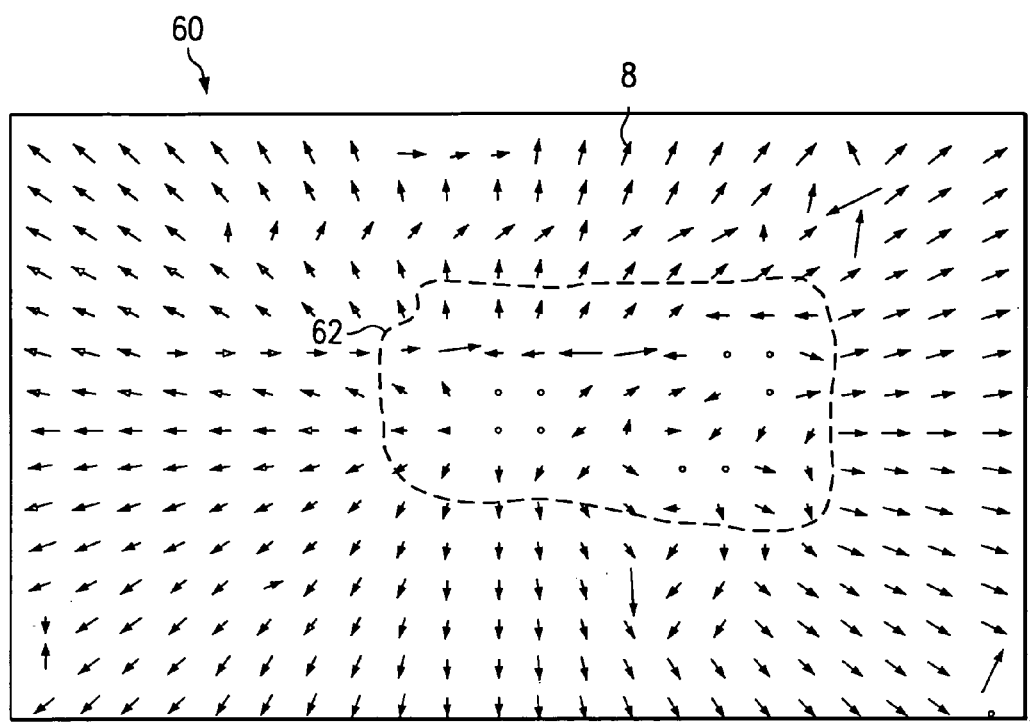
FIG. 5 is an example of a block motion field.
Figure 30:
FIG. 30 is an illustrative frame of "Table Tennis" video sequence.

Motion vectors of the image blocks of a frame form a block motion vector field or block motion field (BMF) 60 as illustrated in FIG. 5 if they are arranged according to the position of their corresponding block. FIG. 5 shows a visualization of the block motion field of a Table Tennis sequence, an illustrative still image of which is shown in FIG. 30. The BMF 60 clearly shows motion due to the camera zooming out. Where the objects are static, the regular circular characteristic of the motion vectors is clearly visible. Where the zooming motion is overlaid by object motion e.g. table tennis player in the center, the motion vectors are more irregular (uncorrelated) 62. Motion vectors of real-world video sequences are typically spatially and temporally correlated, a least in the local neighborhood. This property is exploited by some fast motion estimation algorithms.

As described above, in block matching techniques a block in a current frame is compared to a number of blocks in a previous frame by displacing the current frame within a specified search area in the previous frame. For each displacement, a block distortion measure (BDM) is calculated. The BDM is a measure of the difference or error (correlation) between the current block and a block in the previous frame. Commonly used distortion measures are the mean absolute difference (MAD) and the mean square error (MSE) between pixels of the current and previous frame blocks. For MSE:

$$BDM(i, j) = \frac{1}{N^2} \sum_{m=1}^{N} \sum_{n=1}^{N} g[u(m, n) - u_R(m + i, n + j)] \quad (3)$$

$$\text{with} - R \leq i, j \leq R,$$

where: i and j are the motion vector components; BDM(i,j) is the block distortion measure at displacement (i,j); N×N is the block size; u(m,n) are the luminance values in block in the current frame; $u_n$(m,n) are the luminance values in block in the previous frame taken as reference; R defines the maximum search area; g(x) may be g(x)=$x^2$ to obtain MSE or g(x)=(x) to obtain MAD.

The block in the previous frame that resulted in the smallest BDM is taken as the best matching block 50. The BDM is only used as a comparative measure and the skilled person would understand that many other measures could be used instead of MAD or MSE. For practical software or hardware implementation, the sum of absolute differences (SAD) is preferred since no division operations are required (and it will give the same result since if MAD($i_1$,$j_1$)>MAD ($i_2$,$j_2$), then SAD($i_1$,$j_1$)>SAD($i_2$,$j_2$) with MAD(i,j)=1/$N^2$SAD(i,j)). Therefore, use of SAD will find the same best matching blocks as use of MAD.

Figure 6:
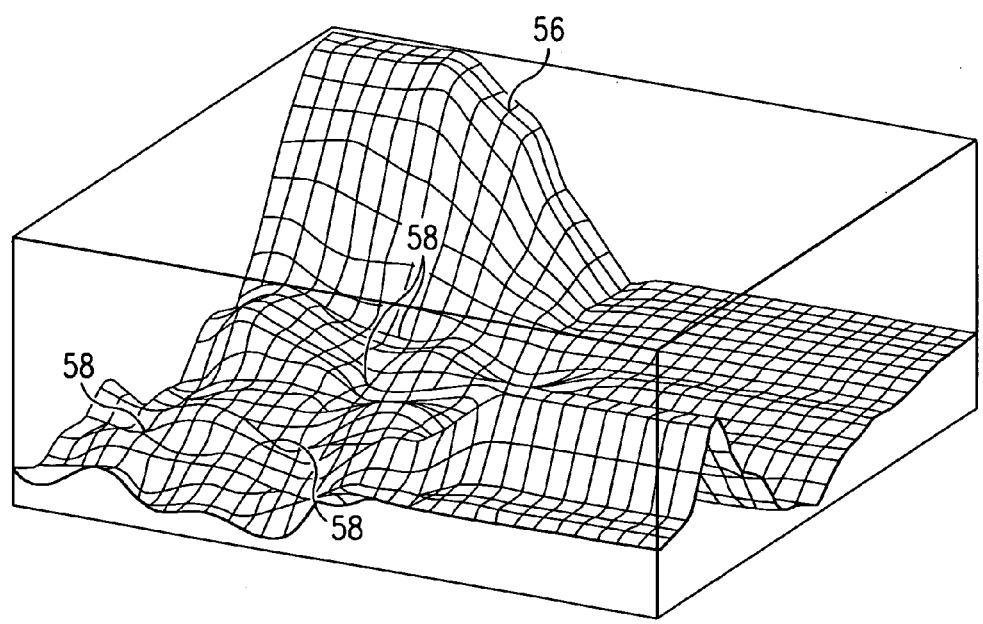
FIG. 6 is an example of a SAD error surface showing multiple local minima.

The BDM(i,j) values for all i and j form an error surface over the search area. FIG. 6 shows a SAD error surface 56 of a 16×16 block that has been displaced in the range R=16. In the example of FIG. 6, the error surface shows several local minima 58. In order to find the global minimum (smallest BDM i.e. the best match) within the defined search area, which represents the true motion vector, BDMs for all possible locations (displacements) have to be calculated. This is called an exhaustive or full search. To speed up the search process, most fast algorithms do not check all locations. However, this increases the probability that the search may find a local minimum 58 instead of the global minimum.

The aim of motion estimation is not primarily to find the best match to some chosen BDM but to minimize the number of bits required to encode the prediction error and the motion vector. Therefore, the choice of an appropriate BDM is important. The BDM should indicate the number of bits required to encode a block as close as possible. The optimum would be to first encode prediction error and motion vector for all possible displacements and then choose the displacement which resulted in the least number of bits. In case of a Discrete Cosine Transform encoding scheme, the total bits queried to encode a block would be:

$$Bits(i, j) = \qquad (4)$$
$$VLC(Q(DCT(predictionerror(i, j))) + VLC(motionvector(i, j))$$

where: DCT is a discrete cosine transform; Q is quantization; and VLC is variable length coding.

Figure 7:
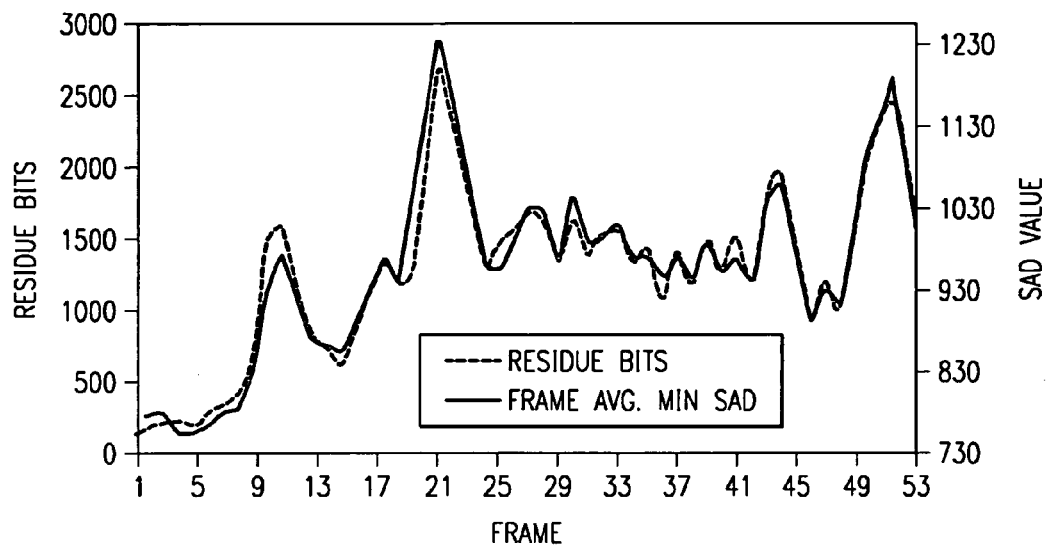
FIG. 7 illustrates a comparison of prediction error with average minimum SAD for an illustrative video sequence "Mother and Daughter", a sample frame of which is shown in FIG. 24.
Figure 24:
FIG. 24 is an illustrative frame of "Mother and Daughter" video sequence.

The prediction error is also referred to as a residue in some terminology. $Bits(i,j)$ would have to be minimized over all possible displacements i and j in the search area. This is computationally demanding and unnecessary since the bit savings are probably small compared to using a BDM. Since the prediction error is nothing else but the spatial pixel luminance difference of two blocks (displaced block difference), the sum of the absolute (pixel luminance) differences (SAD) should be a good BDM to estimate of the bit requirements for the prediction error. FIG. 7 illustrates a comparison of the average minimum SAD found in a frame and the bits required to code the prediction error for the video sequence "Mother and Daughter", an illustrative frame of which is shown in FIG. 24. As can be seen, on average the SAD gives a good estimate of the bit requirements. The true bit requirement depends not only on the value of each individual pixel error but also on the spatial correlation among the pixel errors that is exploited by the DCT, quantization and entropy coding.

A significant problem of BMME is the huge computational complexity of performing an exhaustive search which can amount to more than half of the total complexity of an encoder.

As mentioned above, an example of a video coding scheme is the MPEG-4 (Motion Pictures Expert Group-4) scheme. The MPEG-4 scheme is an object-based scheme which encodes objects in the video frames and characterize their motion as objects in the frame. Objects are represented as Video Object Planes (VOP) which correspond to the notion of frames in conventional frame-based encoding schemes but may have an arbitrary shape. For the purpose of motion estimation and coding, a bounding box containing the VOP is formed and divided into 16×16 blocks, called macroblocks (MB). Each macroblock is further split into four 8×8 blocks. Motion estimation is performed on each video object separately.

To accommodate for arbitrarily shaped objects the standard block matching technique is extended to polygon matching. Macroblock-based repetitive padding is required for the reference VOP. Macroblocks which lie on the VOP boundary are padded so that pixels from inside the VOP are extrapolated to the outside (within the MB). Padding of the areas outside the shape of a VOP is used to find more accurate motion vectors and thus to reduce the prediction error for Macroblocks which lie on the VOP boundary. The absolute (frame) co-ordinate system is used as a reference for all of the VOPs' motion vectors. Motion vectors are restricted within the bounding box of the VOP unless unrestricted mode is chosen. First an integer pixel search is done obtaining one motion vector for the entire 16×16 macroblock and one motion vector for each of the four 8×8 blocks. The encoder then makes the decision whether to encode the macroblock in intra or interframe mode depending which mode results in better coding efficiency (note that a "Prediction" P-VOP can also contain intra coded macroblocks). Then, a half sample search is performed. Finally, the encoder decides whether to use the motion vector found for the 16×16 block or the four motion vectors found for the four 8×8 blocks.

Integer pixel motion vectors are obtained from 16×16 and 8×8 blocks by performing an exhaustive search in a given maximum search area. The 16×16 block integer pixel motion vector, V0, is chosen as the (x,y) vector that resulted in the lowest SAD (sum of absolute differences). Likewise, up to four 8×8 block vectors V1, V2, V3 and V4, one for each of the four 8×8 blocks in a macroblock, are chosen as the (x,y) vectors that resulted in the lowest SADs (but note that only vectors for non-transparent blocks are defined). The 8×8 block search is centered around the 16×16 block vector, with a search window of +2 pixels. If the SAD corresponding to V0 is smaller, V0 is chosen as vector for the whole macroblock or, if the sum of all SADs of the 8×8 blocks is smaller, then V1, V2, V3 and V4 are chosen. After integer pixel motion estimation, the decision is made, whether to encode the macroblock in intra or inter mode. If inter mode is chosen, half pixel motion estimation is performed next.

Half pixel motion estimation is performed for both the 16×16 bock and the four 8×8 blocks. The search area is +1 half sample around the integer vectors V0, V1, V2, V3 and V4. The half pixels values are found through interpolation. The vector resulting in the best match during a half sample search is named MV. If the SAD for the 16×16 block is smaller, MV0 is chosen for the whole macroblock or if the sum of all SADs of the 8×8 blocks is smaller, then MV1, MV2, MV3, MV4 are chosen.

In the unrestricted motion vector mode a motion vector can point outside the decoded area of a reference VOP. For this purpose the bounding box of the reference VOP is extended by 16 pixels in all directions using repetitive padding. This improves the efficiency for block matching at VOP boundaries.

Overlapped block motion compensation is done similar to H.263. Three motion vectors for each 8×8 block are used to predict one pixel. One motion vector is the current motion vector of the 8×8 block, two other motion vectors are chosen from neighboring 8×8 blocks. Each predicted pixel then is a weighted sum of three prediction values, divided by 8 (with rounding). In order to obtain the three prediction values, three motion vectors are used: (1) the motion vector of the current block, and two out of four "remote" vectors: (2) the motion vector of the block at the left or right side of the current block; (3) the motion vector of the block above or below the current block.

A major problem with block matching motion estimation is its huge computational complexity which can amount to more than half of the total complexity of an encoder. This is because for each block comparison, a distortion measure has to be computed. Assuming a block size of 16×16 and displacements of −16 . . . +15 in both vertical and horizontal directions (equivalent to a search area of 32×32) block distortion measures for $32^2=1024$ search locations (check blocks) have to be calculated. In the case of using sum of absolute differences (SAD) the computation of a block distortion measure for one check blocks involves $16^2=256$ subtractions, $16^2=256$ absolute operations and $16^2-1$ 255 additions, totaling 767 operations. Thus, one whole block matching process requires 1024×767=785,408 operations, and for one frame in a typical CIF format with ninety-nine 16×16 blocks, 77, 755, 392 operations are required.

A number of important fast block motion algorithms currently exist.

The methods employed by fast algorithms can be categorized as described hereinafter, though combinations of these methods is possible.

The reduction of the number of check blocks is the most commonly used method in fast algorithms since the method offers huge computational savings. While an exhaustive search checks all possible displacements within the search window, checking block reduction methods only choose a subset of blocks. For instance, the three step search (TSS), which is one of the most successful algorithms proposed, completes the matching process of one block within a search window of +7 by checking only 27 displacements instead of 64. The crucial design issue is the choice of an optimal subset of check blocks so as to achieve a high probability of finding the global minimum and avoiding the search getting trapped in a local minimum.

One of the most commonly used block distortion measures (BDM) used to measure the correlation between blocks is the sum of absolute differences (SAD). Some algorithms propose a lower complexity BDM to speed-up the search. Distortion measures such as counting the number of matching pixels or integral projections have been used for this purpose.

Some algorithms use the hierarchical method and start with a search on sub-sampled images. The motion vector found is then used as starting point for the next search on higher resolution images. The search stops after the original image resolution was used.

Other algorithms use alternate sub-sampling matches only every other block. The motion vector for the blocks in between are then sampled estimated using the motion vectors of the surrounding blocks.

The properties of the error surface over a search area is utilized in fast algorithms. For example, the distortion measure increases as the check blocks moves away from the global minimum. Some algorithms assume that whole error surface is unimodal. However, a better assumption is that it is only unimodal within a small neighborhood of the global minimum.

The distribution of motion vectors may also be caused since the motion vector distribution is biased-biased, i.e. biased towards the motion vector (0,0). This is particularly true for sequences with large regions of static background or quasi-static motion. For sequences with fast and complex motion, the bias-bias is still relatively high, but also contains a more widespread distribution at larger motion vector components.

The distribution of motion vector differences may also be used. The block motion field of a real world image sequence is usually gentle, smooth, and varies slowly. This implies that the inter-block correlation of motion vectors is relatively high. Therefore, the motion vector difference between two adjacent blocks is relatively small. Consequently, the distribution of motion vector differences is highly zero-biased. This is true for the distribution obtained over one frame as well as the whole sequence.

The distribution is diamond shaped, which means that the motion vector difference is more likely to lie on the x and y-axes.

Figure 8:
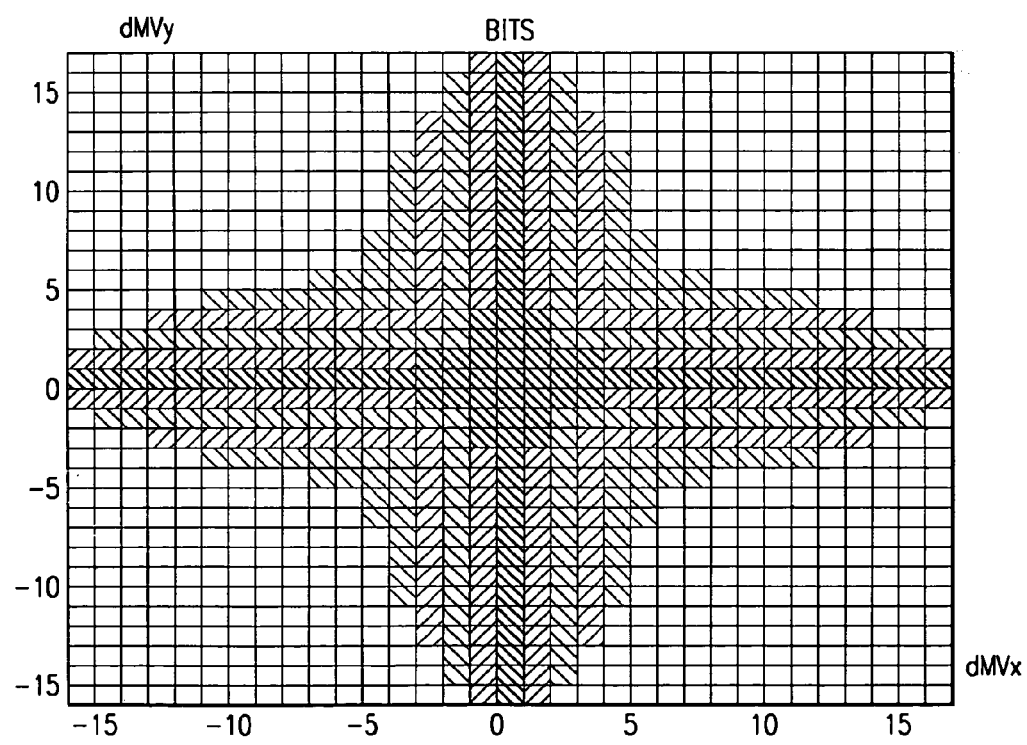
FIG. 8 illustrates bit length against x and y components for motion vector differences of a VLC coding table in MPEG-4.

These two properties can be exploited, for instance for tone efficient coding of motion vectors. A variable length coding table for motion vector differences can be designed in such a way that the shortest bit lengths are assigned to the motion vector differences that are most likely. FIG. 8 shows the bit length as gray value against the x and y component of the motion vector difference.

In an object-based coding scheme, such as used in MPEG-4, a video object is typically a semantic object in a scene. Thus, the video object is likely to exhibit an even higher spatially correlated block motion field (BMD) than in a typical frame-based sequence because blocks containing object boundaries are eliminated.

In accordance with an embodiment of the present invention, a fast block motion estimation method will now be described which efficiently exploits this correlation and so achieves an increase in the speed of the search process.

Embodiments of the invention are not limited to object-based coding schemes. The principles and teachings disclosed herein in accordance with the present invention may be applied to frame-based coding schemes as well as object-based coding schemes such as MPEG-4, and is not limited to such schemes. In this respect, a method in accordance with an embodiment of the invention is independent of how the object is represented. The object could be a conventional, whole frame, i.e. frame based coding. The algorithm can be integrated into an MPEG-4 codec, however it is not specific to MPEG-4.

Figure 15A:
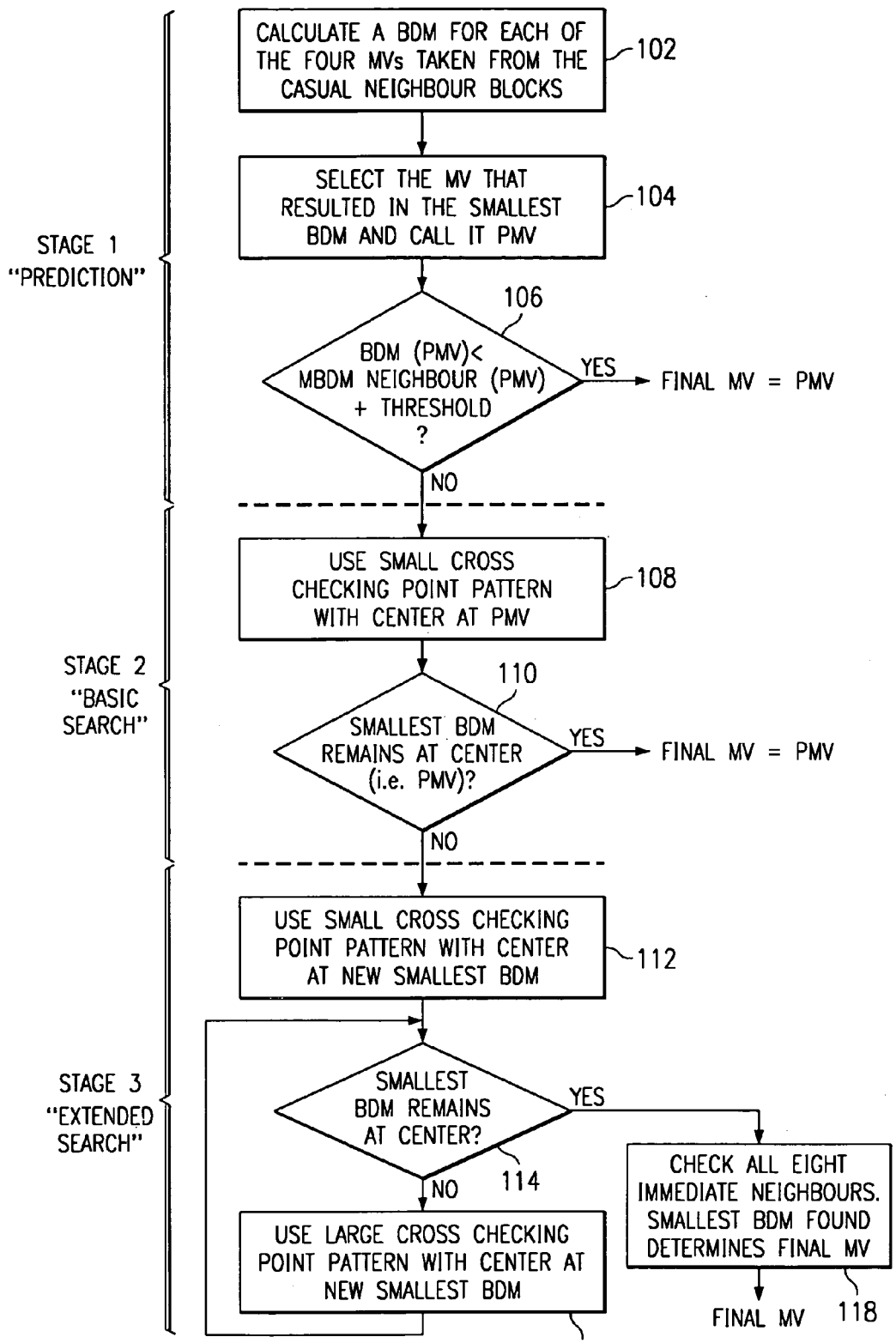
FIG. 15A is a flow diagram for an embodiment of the invention.

In accordance with an embodiment of the invention a video coding method is disclosed which seeks to minimize the probability of the block matching search getting trapped in a local minimum. The first step of the method seeks to place at least one checking block (CB) as close as possible to the global minimum of the error surface for the current block. Referring now to the example of FIG. 9, this is done by evaluating the sum of absolute differences (SAD) at the locations pointed to by the motion vector MV1, MV2, MV3, MV4 of each of the four causal neighbor blocks 63, 64, 65, 66, between the current block and the blocks in the previous frame corresponding to the motion vectors MV1, MV2, MV3 and MV4. Each of the motion vectors MV1, MV2, MV3, MV4 has already been evaluated for the current frame, and in the illustrated example are; MV1=(0,0), MV2=(−2,3), MV3=(1,6) and MV4=(−4,−1). Although the foregoing motion vectors are represented as whole pixel displacements in the horizontal X and vertical Y (X,Y) directions, fractional pixel displacements may also be used. Half-pixel and quarter-pixel are typical fractional resolutions. The motion vector yielding the smallest SAD is assumed to be closest to the true motion vector (represented by the global minimum) of the current block and is chosen as prediction motion vector PMV. FIG. 15A illustrates this prediction process. For an object-based scheme such as MPEG-4, if a neighbor block is outside the object the corresponding MV is set to zero.

This first step of the method is based on the assumption that the block motion field is correlated. This assumption can be considered valid only if a video object exhibits coherent motion. In fact, similar schemes have already been proposed for frame-based video coding in the past. They were shown to give good motion vector estimates for low bit rate coding, i.e. for video conferencing etc, where many image regions are static or quasi-static. Most of the problems encountered with the known prediction schemes are due to blocks that contain parts of more than one moving object. If the different objects moved at different speeds and/or in different directions, the block motion field of true motion vectors is much less correlated. The motion of a neighboring block containing two objects moving in different directions is unlikely to give an accurate estimate for the motion of the current block containing spatial detail of only one of the objects. In true object-based video coding this problem is eliminated (providing, of course, that the object segmentation is reasonably accurate). Therefore, a predictive scheme in accordance with an embodiment of the present invention for object-based coding should be even more reliable than in the frame-based case, although embodiments may still be applied to frame-based coding.

Preferred embodiments of the invention comprise three search stages, and one, two or all three stages may be utilized to determine an estimated motion vector for a current block. That is to say, not all three search stages will be used for determining every estimated motion vector, but whether or not a stage is used will depend on the accuracy of the search in the previous stage.

Stage 1

In the discussions of prior art motion estimation schemes, it was assumed that the MV resulting in the smallest BDM is the best correlated one, i.e. closest to the global minimum. However, that MV is only the closest among all four candidate vectors MV and may not be close enough. If it is known at this stage that the predicted motion vector (PMV) is accurate enough (i.e. it is valid to assume that the current block and the neighbor block are indeed motion correlated as assumed in the prior art), such that a further search is unlikely to find a motion vector closer to the global minimum, the search could be stopped at this point or after a local refinement search and the PMV assigned as the estimated motion vector for the current block. Many prior art fast algorithms check the SAD (or other BDMs) at the predicted location against a fixed threshold level in order to make this decision. However, BDMs depend not only on the block motion but also on the luminance levels and spatial detail in the block. Threshold schemes typically work well with some image sequences and less well with others, depending on the image content. Therefore, the absolute value of a BDM is an unsuitable criterion to determine whether the predicted motion vector is close to the global minimum or not. It is possible to adapt the threshold level based on the current motion vector statistics, but this is very computationally expensive, especially if performed on a block-level basis.

The initial question, whether the chosen prediction motion vector is accurate enough cannot be answered directly. However, the Applicant has formulated the question using three steps in the following novel and inventive way:

i) Is the chosen prediction vector accurate enough?

ii) Is the motion of the two neighbor blocks correlated?

iii) Do the two blocks belong to the same "object"?

If question iii) can be answered "yes", it can be assumed that the initial question, i), is likely to be answered with a "yes" too. This reasoning merely confirms what has already been established, namely, that image blocks within an object are likely to exhibit correlated motion. It also means that the chosen prediction motion vector can be assumed to always be accurate enough. This may indeed be true for uniform and rigid objects. However, this may not be true for objects with more complex motion, such as, for instance, a running person. In the case of more complex motion, a similar problem as in frame-based sequences occurs, i.e. neighboring blocks may contain motion with different speed and/or direction. However, if a criterion is found that can distinguish correlated blocks from uncorrelated ones at an early stage, only the less correlated blocks require further checking with a more thorough search.

The Applicant has defined the solution as being to narrow down the definition of "object" in question iii) to "region of an object with uniform motion". Even a video object of, for instance, a running person will have image parts that exhibit substantially coherent motion, especially the main body or the head. In this regard, the object is considered to consist of several image blocks. Such a definition also leads the method to be used in frame-based coding.

Figure 10:
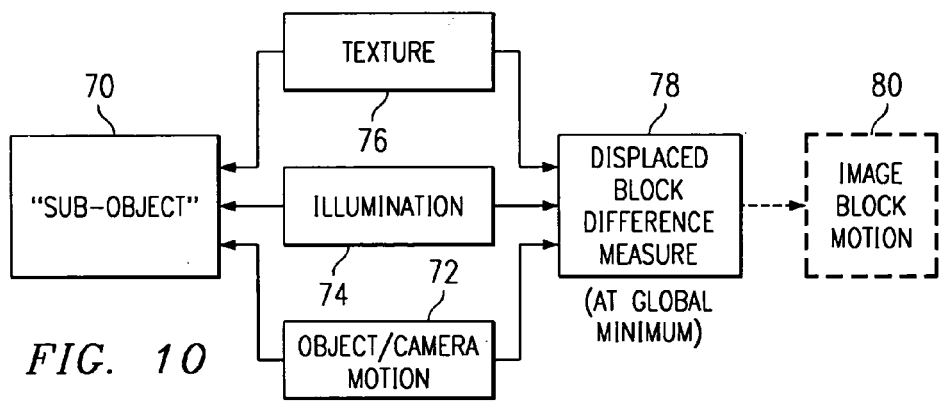
FIG. 10 is a schematic illustration of the relationship between a sub-object and a block distortion measure.

The typical characteristics of a "region of an object with uniform motion", includes the texture and illumination of the region also and these are also likely to be similar across this region. Referring to FIG. 10, through this definition, the applicant has broken up a complex video object into uniform "sub-objects" 70 that exhibit coherent motion 72, illumination 74 and texture 76. A region of uniform motion may be divided into two or more sub-objects if the region contains different types of textures since respective sub-objects will exhibit different average pixel values, for example. In order to classify an object into sub-objects according to the above definition, an appropriate criterion needs to be established. The Applicant has found that an appropriate criterion can be based on a displaced block difference or distortion measure 78 such as SAD, MAD or MSE. This is because the same characteristics that define a sub-object, e.g. pixel values, also determine the value of these block distortion measure 78.

Thus, if two neighbor blocks belong to the same sub-object, an exhaustive block matching search should find the same motion vector 80 and the same minimum BDM value for both blocks.

In the first stage the motion vector for best correlated block for the previous frame is used as the starting point for selecting the prediction motion vector for the current frame. The best correlated block is defined as the neighbor block having the lowest or minimum BDM of the causal neighbor blocks. The PMV of the best correlated neighbor block is then used to displace the current block to a position in the previous frame, and the BDM evaluated. Thus, the PMV is selected from the current frame and checked against the previous frame.

In an embodiment of the invention the BDM for the current block found at the prediction vector is compared with the Minimum Block Distortion Measure (MBDM) of the neighbor blocks (i.e. the BDM for the best correlated block) from which the PMV was taken. However, the Applicant has recognized that, in practice it is very unlikely that the exactly same MBDM and current block BDM values are obtained. Therefore, the Applicant has defined a BDM value band represented by the following relationship:

$$|MBDM_{Neighbor}(PMV) - BDM_{current}(PMV)| < \text{Threshold} \qquad (5),$$

where: $MBDM_{Neighbor}(PWV)$ is the minimum block distortion measure of the neighbor block giving the minimum block distortion measure and from which the prediction motion vector was taken, and represents the correlation of that neighbor block with the previous frame; $BDM_{current}(PMV)$ is the block distortion measure of the current block with the previous frame displaced by the prediction motion vector, and is a measure of the correlation of the current block with the previous frame for a displacement corresponding to PMV; and Threshold is a positive valued number.

If the relationship is satisfied then the two blocks may be defined as belonging to the same sub-object and that therefore their motion is correlated. In that case, the PMV is considered sufficiently close to the global minimum such that a further search is unlikely to find a smaller BDM. Thus the PMV is assigned as the estimated motion vector for the current block. The value of "Threshold" is based on a trade-off between processing speed and accuracy (quality of image) i.e. a better correlation of the current block with the previous frame is unlikely to be found.

The value "Threshold" can be determined on a trial and error basis by looking at the quality of the images coded with different "Threshold" values. The "Threshold" may be varied.

Figure 9:
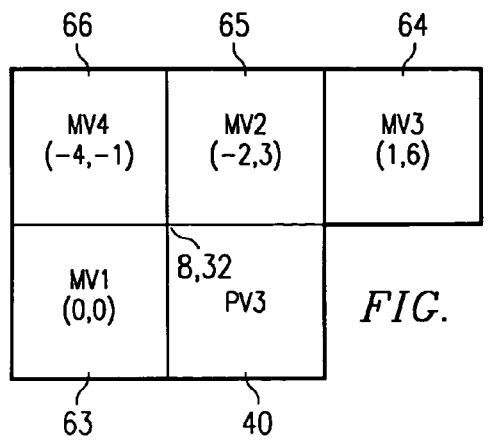
FIG. 9 schematically illustrates current neighbor blocks for evaluating a prediction motion vector of a current block.

In an illustrative example referring to FIG. 9, a current block 40 has four causal neighbor blocks 63, 64, 65 and 66 having motion vectors as referred to above. In the present example the current block location is defined by the top-left pixel co-ordinates which are (8,32). For a video encoder based on 8×8 pixel blocks, the top-left pixel/co-ordinates of current block location are multiples of 8. As is well-known to the person of ordinary skill in the art, motion vector estimation may be based on other types of blocks such as 16×16 pixel blocks for example.

To evaluate which of the motion vectors MV1 to MV4 provide the best correlation, 8×8 pixel blocks are formed in the previous frame having respective top-left pixel locations (8+0, 32+0)=(8,32), (8−2, 32+3)=(6,35), (8+1, 32+6)=(9, 38) and (8−4, 32 −1)=(4,31). Four BDMs, one for each block, are evaluated between the pixels in the current block and the pixels in each of the four blocks formed in the previous frame. The correlated motion vector resulting in the smallest BDM (MBDN) i.e. best correlation, is assigned as the predicted motion vector and if it satisfies relationship (5) then it is assigned as the estimated motion vector, otherwise the process proceeds to stage 2 described below.

As shown in FIG. 10, a difference in BDM only indicates that some combination of the characteristics of an object e.g. texture, illumination or motion, has changed. However, as illustrated by FIG. 10, one cannot tell which characteristic has changed by measuring BDM alone. For instance, if two neighbor blocks contain an object with rigid motion, but the texture is different, the two blocks would be classified into separate sub-objects. In this case, a more thorough search would still be necessary since it is not known whether the motion is correlated or not.

Figure 11:
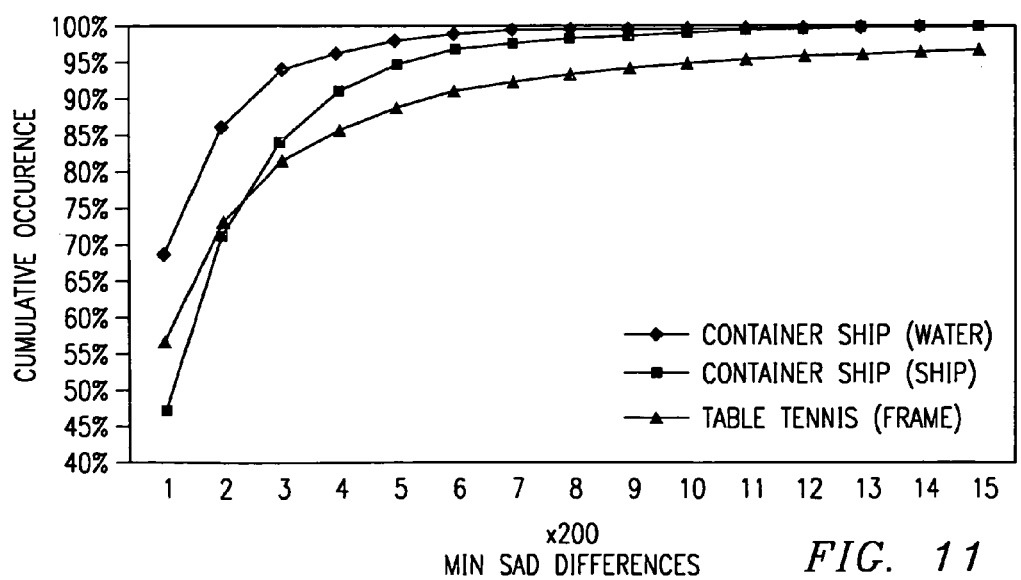
FIG. 11 is a graph.

The Applicant has conducted experiments that strongly support the above reasoning. The results suggest a high correlation between minimum SADs (obtained through exhaustive search) of neighboring blocks within the same object, i.e. statistically spatial local variation of block image and motion content is small. FIG. 11 shows the frequency of occurrences of minimum SAD (MSAD) differences between the two best correlated neighbor blocks for the video objects "water" and "ship" from the sequence "container ship", and the frame-based sequence "table tennis", illustrated in FIGS. 27 and 30, respectively.

Figure 27:
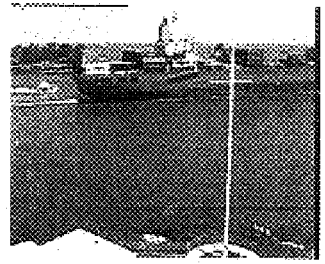
FIG. 27 is an illustrative frame of "Container" video sequence.
Figure 28:
FIG. 28 is an illustrative frame of "News" video sequence.

As can be seen from FIG. 27, for the object "water", about 70% of the minimum SAD differences result in values below 200. However, for the object "ship" this is true only for about 47%. This makes sense, since the "water" is very coherent in terms of motion and also in texture. However, although the "ship" exhibits rigid and coherent motion, the kinds of texture it contains is far more diverse. This diversity in texture causes the minimum SAD differences to be higher.

Stage 2

If relationship (5) is not satisfied, the PMV is too inaccurate. In accordance with an embodiment of the invention the search method continues to a second stage with an exploration of the neighborhood of the PMV. Well-known statistical distributions of MV differences show that a very high proportion of MVs are found within a small radium around the best correlated MV of a neighbor block. In a preferred embodiment, this second search step is performed using a check block pattern with only four check blocks (top, bottom, left and right of a center check block) as illustrated in FIG. 12. The center check block location is derived from the PMV. Other checking block patterns may be used. If none of the four check blocks were found to have better correlation with the current block than the current center check block, the search stops. This second search step is particularly useful in cases where the termination criterion established by relationship (5) found the prediction vector not accurate enough due to differences in texture, but motion is actually correlated.

Continuing with the illustrative example started in stage 1, for a PMV selected to be MV2 (−2,3) yet not satisfying relationship (5) a new set of candidate motion vectors is created using the 1-step cross pattern illustrated in FIG. 12. The new set of candidate motion vectors are (−2,3)+ (−1,0) −3,3), (−2,3)+(1,0)=(−1,3), (−2,3) +(0,−1)=(−2,2) and (−2,3) +(0,1)=(−2,4). As in stage 1, four 8×8 pixel blocks in the previous frame are formed by adding candidate motion vectors to the top-left pixel co-ordinates for the current block to form previous frame check blocks having top-left co-ordinates of (8,32)+(−3,3) =(5,35), (8,32)+(−1,3)=(7,35), (8,32)+(−2,2)=(6,34) and (8,32)+(−2,4)=6,36). The center check block has top-left co ordinates (8,32)+(−2,3)=(6,35). The BDMs for each check block defined by the candidate motion vector against the current block are derived, as well as the BDM by the center check block against the current block. The lowest BDM defines the best correlated (winning) block and hence motion vector.

If the lowest BDM is for the correlation of the center check block with the current block (i.e. the center check block "wins"), then the motion vector (−2,3) defining the center check block is assigned as the estimated motion vector. Otherwise, the search proceeds to stage three.

Stage 3

The search is extended to stage 3 if one of the four check blocks is found to be better than the current center check block in the basic search step of stage 2. The winning check block becomes the new center check block. A type of gradient descent search may be used similar to the one described by reference [1]to find the best correlated block with the current block from the new center check block and surrounding center check blocks. In a preferred embodiment, the stage 3 search continues with another check block pattern as shown in FIG. 12 with a spacing of one based around the new center check block to determine a block with the minimum BDM (e.g. SAD).

Continuing with the illustrative example for a PMV (−3,3) to yield the lowest BDM in stage 2 the new set of candidate motion vectors are (−3,3)+(−1,0)=(−4,3), (−3,3)+(1,0)= (−2,3), (−3,3)+(0,−1)=(−3,2) and (−3,3)+(0,1)=(−3,4). The top-left most co-ordinates of the new center check block are (8,32)+(−3,3)=(5,35), whilst the four further check blocks in the previous frame have top-left co-ordinates of (8,32)+ (−4,3)=(4,35), (8,32)+(−2,3)=(6,35), (8,32)+(−3,2)=(5,34) and (8,32)+(−3,4)=(5,36). As in stage 2 the lowest BDM is evaluated. If the lowest BDM corresponds to the new center check block then the PMV corresponding to it ((−3,3) in this example) is assigned to the estimated motion vector. Otherwise, the PMV giving the lowest BDM (e.g. (−3,2)) is used for a similar search but using a +2/−2 cross pattern.

For the +2/−2 cross pattern the stage 3 search adopts the pattern shown in FIG. 13. As can be seen in FIG. 13, the spacing is increased to two which is in order to reduce the possibility of the search getting trapped in a local minimum.

The four new candidate vectors now become (−3,2)+(−2,0)=(−5,2), (−3,2)+(2,0)=(−1,2), (−3,2)+(0,−2)=(−3,0) and (−3,2)+(0,2)=(−3,4). The new center check block has top-left co-ordinates (8,32)+(−3,2)=(5,34), whilst four yet further check blocks in the previous frame have top-left co-ordinates of (8,32)+(−5,2)=(3,34), (8,32)+(−1,2)=(7,34), (8,32)+(−3,0)=(5,32) and (8,32)+(−3,4)=(5,36). Again the BDMs are evaluated against the current block. The yet further check block yielding the lowest BDM is defined as a center block. The stage 3 search iterates until the block yielding the lowest BDM remains as the center block, then this lowest BDM is checked against the BDMs of all eight neighbor blocks with respect to the center block to refine the search of the eight neighbor blocks. FIG. 14 shows a summary of the method in accordance with a preferred embodiment of the invention.

The motion vector corresponding to the block yielding the lowest BDM is then assigned as the estimated motion vector.

Referring now to FIG. 15A, a flow diagram will be described illustrating the steps for implementing a preferred embodiment of the invention. For example, an embodiment of the invention may be implemented by way of computer program configuring a processing device. Typically, embodiments of the invention will be implemented in a processing device, particularly a Digital Signal Processor (DSP), although a general purpose processor may also be used. Embodiments of the invention may also be implemented in data processing apparatus and systems such as computer systems, for example a personal computer.

The flow diagram of FIG. 15A is split into 3 stages corresponding to the 3 stages of the search method described above. Stage 1 comprises determining a prediction motion vector for a current block and begins at step 102 where a BDM is evaluated corresponding to the correlation between the current block and previous frame at locations defined by the motion vectors of the four causal neighbor blocks (illustrated in FIG. 9) relative to the current block location. Not all causal neighbor blocks need be used. The motion vector which results in the lowest BDM is determined at step 104 and defines the prediction motion vector (PMV) for the current block. Process control then flows to step 106, where it is determined whether or not the PMV is sufficiently accurate. In the currently described embodiment the accuracy of the PMV is determined by the following relationship:

$$BDM(PMV) < MBDM_{Neighbor}(PMV) + \text{Threshold} \quad (6)$$

where: $BDM(PMV)$ is the block distortion measure for the current block at PMV; $MBDM_{Neighbor}(PMV)$ is the minimum block distortion measure of the neighbor block from which PMV was taken; and Threshold is a value determined to set an accuracy level for $BDM(PMV)$.

Optionally, the test at step 106 may utilize a relationship expressed as relationship 4) above.

If it is determined that the PMV is sufficiently accurate, then the result of step 106 is yes and PMV is assigned as the motion vector MV for the current block. However, if the test at step 106 fails then process control flows to step 108 of stage 2 of the search method.

Stage 2 of the search method undertakes a "basic search" for the best motion vector for the current block. At step 108 a small cross check pattern (step size of one picture element), e.g. as illustrated in FIG. 12, centered on the block in the previous frame corresponding to the PMV is used, to determine the correlation (BDM) of the current block with previous frame blocks in accordance with the motion vectors of each of the check blocks in the check pattern. At step 110, it is determined whether or not the smallest BDM is still that of the center check block of the pattern. That is to say, the BDM corresponding to the current block and previous frame block defined by the PMV. If the result of the test at step 110 is yes then the PMV is assigned as the motion vector for the current block. However, if the result of step 110 is no and the motion vector of one of the check blocks yields the smallest BDM, then process control flows to step 112 of stage 3 for an extended search.

The block having the smallest BDM as determined in stage 2 is then set as the center check block for a new small cross check block pattern at step 112. The search is conducted in substantially the same manner as in step 108 and at step 114 it is determined whether or not the smallest BDM corresponds to the center check block. If no, then process control flows to step 116 where a large cross check pattern (e.g. two picture element step size) centered on the block having the smallest BDM is searched. The large cross check pattern may be as described above with reference to FIG. 13. Process control then flows back to step 114 to determine if the smallest BDM still corresponds to the center check block. If yes, then the process flows to step 118 where the BDM corresponding to the motion vector for each of 8 immediate neighbors of the center check block applied to the current block is evaluated. The motion vector resulting in the smallest BDM is then assigned to the current block.

The foregoing described flow diagram illustrates the method operating on image frame data within the boundaries of the image frame. Current blocks at an edge of an image frame may not have neighboring blocks, i.e. if the current block is the first/last block in a row or column of image frame data. In this case, if a neighboring block does not exist then the corresponding motion vector is set to zero (0,0). In an extreme example, for the first block in a frame (or object in an object-based coding system) all four candidate motion vectors are set (0,0) since either they "exist" outside the image frame, or have not yet been evaluated.

For the first block in a frame or object there is no neighbor block. Therefore, the block distortion measure $BDM_{neighbor}$ (PMV) is initialized to zero for all the "missing" neighbor blocks. Thus, the current (first) block is correlated with the first block of the previous image frame to yield BDM(PMV) where PMV is zero. This ensures that the method does not stop due to early termination in accordance with relationship (4) or (5) due to a high BDM being ascribed to the missing neighbor blocks. However, the method will stop if BDM (PMV) is less than the Threshold of relationships (4) or (5) where PMV is zero. Such a result is satisfactory since Threshold is typically small compared to a typical BDM, and if BDM(PMV) is less than Threshold it is likely that a continuing with the method would yield only negligible improvement. Optionally, BDM(PMV) may be set to negative (−)Threshold value so that the search would never stop in stage 1. However, if there are many small stationary objects in an image frame such an approach would result in increased complexity. This is because stationary blocks typically have a small BDM that would normally cause termination, but with BDM(PMV) set as above would be subjected to stages 2 and possibly 3 also. Additionally, if there are many small objects, then there would be many "first" blocks for which his condition would be true.

In a preferred embodiment, once a BDM for a check block has been evaluated it is stored in memory, for example in an array/look-up table, for future use in later stages of the search method which saves re-calculating BDMs unnecessarily. Preferably, the search method is implemented such that once a BDM sum for a block exceeds the current smallest BDM then the calculation of that BDM is terminated. This enhances the speed of operation of the search method.

The search method may be implemented in a processing device such as a DSP. Typically, video encoders are implemented as DSPs and the foregoing search method may be included in such an encoder.

An example of a communications apparatus in accordance with an embodiment of the invention is illustrated in FIG. 15B. Communications apparatus 120 may be a radio telephone or other wireless communications device such as a wireless enabled Personal Digital Assistant (PDA) like the Nokia (RTM) Communicator. Communications apparatus 120 may comprise other communication devices, and embodiments of the invention are not limited to the described embodiments. Communications apparatus 120 includes a processing device 122 such as a DSP. The DSP 122 includes a core processor 124, memory 126 and input/output interface unit 128. The core processor implements the coding process described above with reference to FIG. 15A under the control of program instructions. The program instructions for configuring the core processor to implement the coding process are stored in memory 126, and communicated to core processor 124 during operation of the program. Optionally, as will be evident to the ordinarily skilled person, memory 126 may be a local program instruction cache for the core processor 124, and the computer program as a whole is kept in off-chip memory. Typically a general purpose processor, not shown, is employed to manage general functions of the communications apparatus 120.

Image frames are supplied to the core processor from video source 132 via input/output interface unit 128. The core processor 124 processes the frames under control of the computer program, and puts encoded video signals to transmitter 130. The encoded signals output to transmitter 130 may have undergone other types of coding in the core processor suitable for the communications system over which transmitter 130 will transmit them. For example, the video signals may be error correction encoded and channel coded.

The search method described above has been integrated into an MPEG-4 encoder to assess its performance. The method is compared to the ADZS-ER [3] and DS [4] algorithms that have been chosen by MPEG as fast algorithms for MPEG-4. Furthermore, it is compared to an N-step search algorithm based on the concept of Koga [5] and to the Simplex algorithm [6].

In order to assess the performance of the algorithms themselves, the average prediction error per pixel in a frame was measured. This was done by summing up the minimum SADs determined over the whole frame and then dividing the sum by the number of pixels in the frame. Typically, the so-called fast algorithms replace only the integer pel macroblock (MB) full search, whereas the 8×8 block search and half-pel search remain the same. To measure the algorithm performance and not the performance of the whole encoder, the minimum SADs were taken right after integer pel MB search. Also, instead of using the reconstructed previous VOP, the original previous VOP is used as a reference to eliminate quantization effects.

The performance of an algorithm is best measured by its ability to find a low prediction error, i.e. low minimum SAD and to produce correlated MVs so that difference coding results in fewer bits. Also, by using the original previous VOP, each algorithm is given the same reference VOP which makes frame results more comparable. The MPEG-4 VM full search was modified not to reduce the SAD of (0,0) to ensure the global minimum will be found. However, anything else which may also affect the motion estimation performance is done according to MPEG-4, e.g. the way VOPs are divided into MBs and the way the reference VOP is padded. Unrestricted MV search is used (additional 16 pels around the VOP bounding rectangle).

FIG. 16 shows a table of test image sequences for object-based coding, used in evaluating and computing the algorithms.

The Definition of Classes in the Table of FIG. 16 is:
Class A: Low spatial detail and low amount of movement.
Class B: Medium spatial detail and low amount of movement or vice versa
Class C: High spatial detail and medium amount of movement or vice versa
Class D: Stereoscopic
Class E: Hybrid natural and synthetic
Class F: 12-bit video sequences.

The test conditions for the image sequences are set out in the table of FIG. 17.

The Table illustrated in FIG. 18 shows the average number of check blocks for each of the test sequences. As can be seen the search method disclosed herein achieves the lowest number of check blocks for each object. On average the disclosed method requires only 64% of the number of check blocks of the fastest of the other algorithms (ADSZ-ER). The Table in FIG. 19 shows that the average means square error (MSE) obtained in accordance with the method disclosed herein (4PMV+0(300)) is still better than that of ADSZ-ER.

Figure 25:
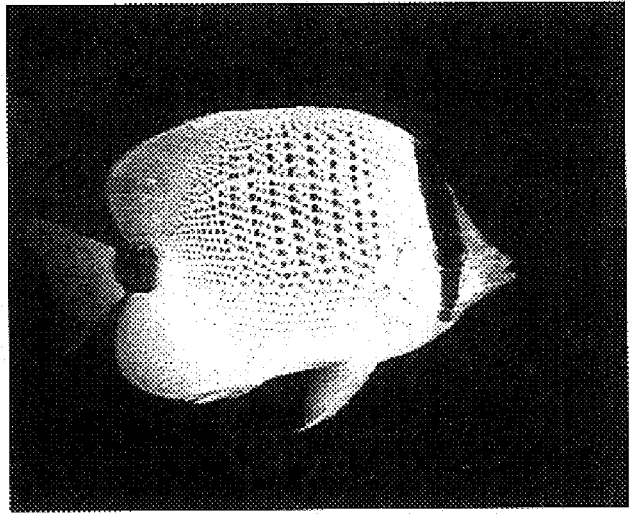
FIG. 25 is an illustrative frame of "Bream" video sequence.
Figure 26:
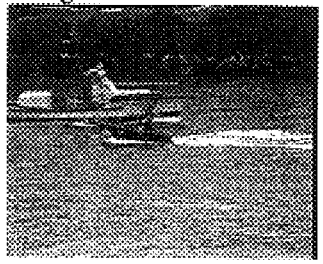
FIG. 26 is an illustrative frame of "Coastguard" video sequence.
Figure 29:
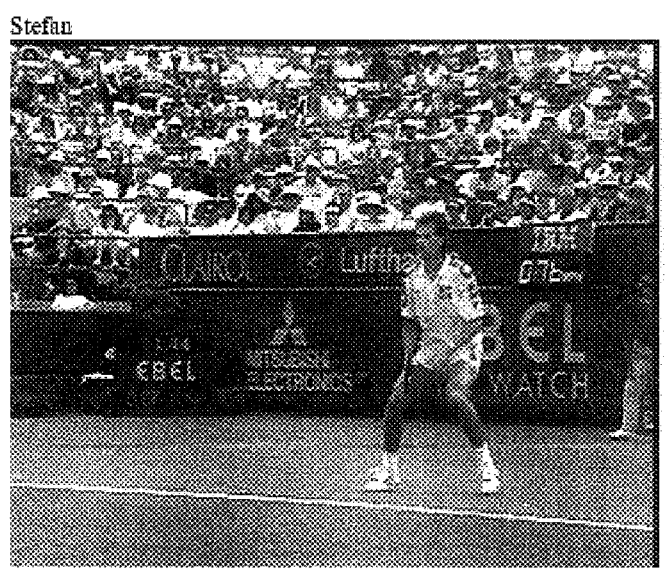
FIG. 29 is an illustrative frame of "Stefan" video sequence.

The performance of the disclosed method (4PMV+0 (300)) and ADSZ-ER is similar except for the sequences "Bream" (FIG. 25) and "Stefan" (FIG. 29) for which the disclosed method shows considerably higher performance in terms of both number of check blocks (CBs) and MSE. The relatively high number of CBs for "Bream" is due to the fact that motion is correlated but the average minimum BDM value that can be found is above the threshold used by ADSZ-ER. It therefore continues to try to find a smaller BDM despite there being none. The termination criterion of the present method can be seen as adaptive to the local context and can therefore detect correlation of motion.

Figure 20:
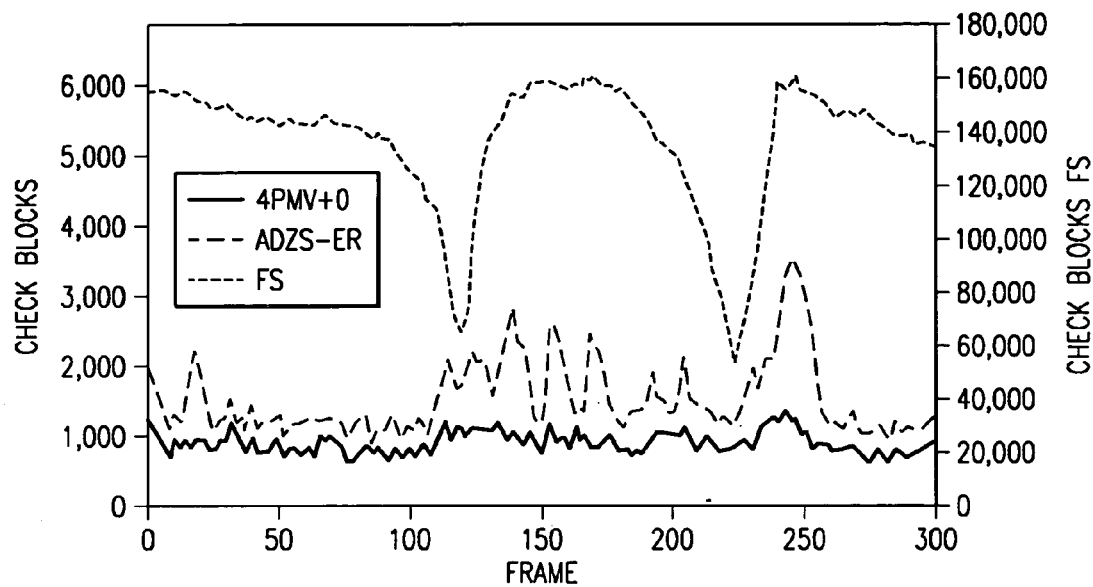
FIG. 20 is a graph.
Figure 21:
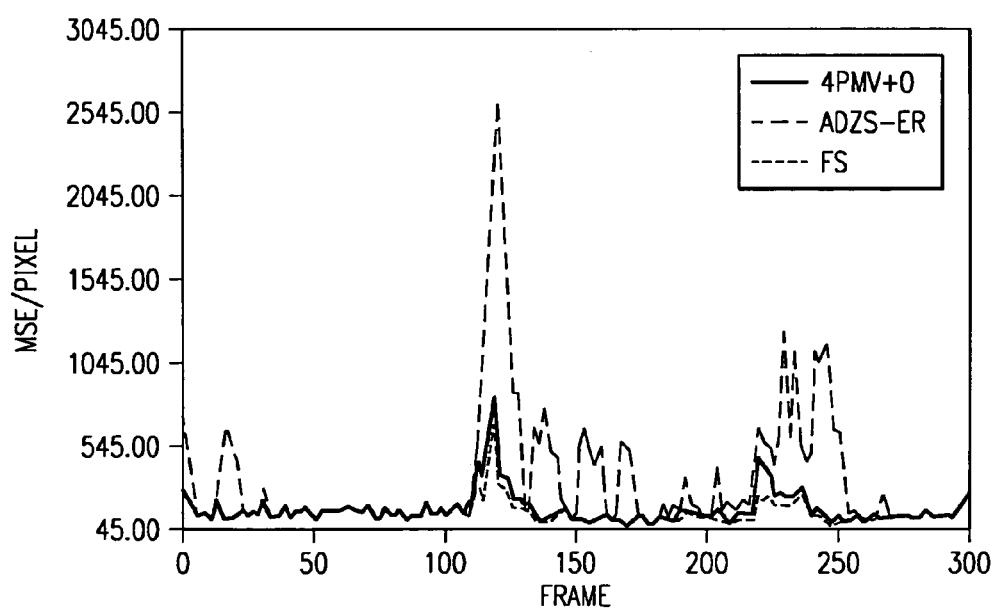
FIG. 21 is a graph.
Figure 22:
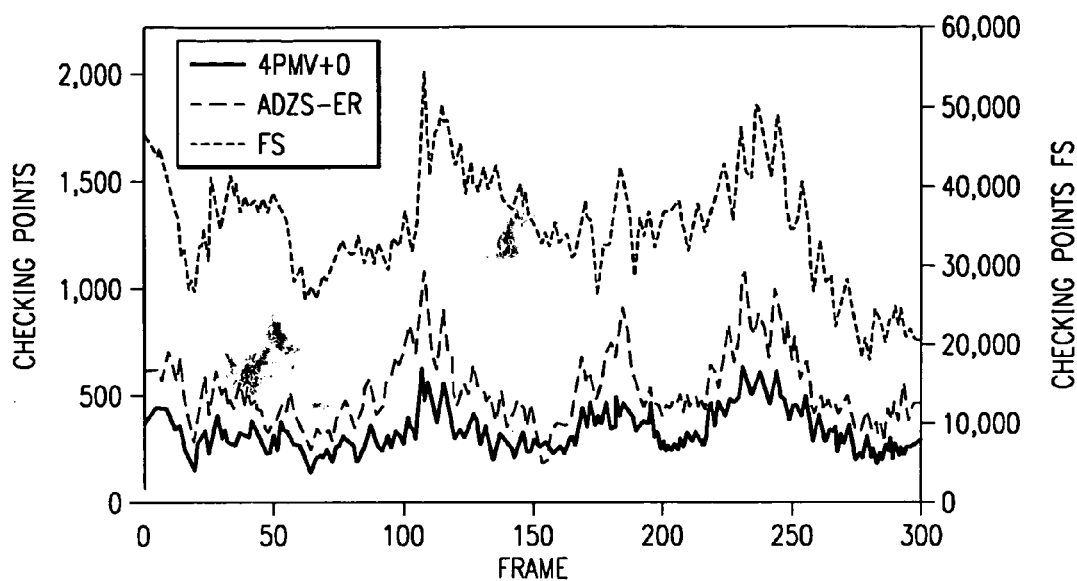
FIG. 22 is a graph.
Figure 23:
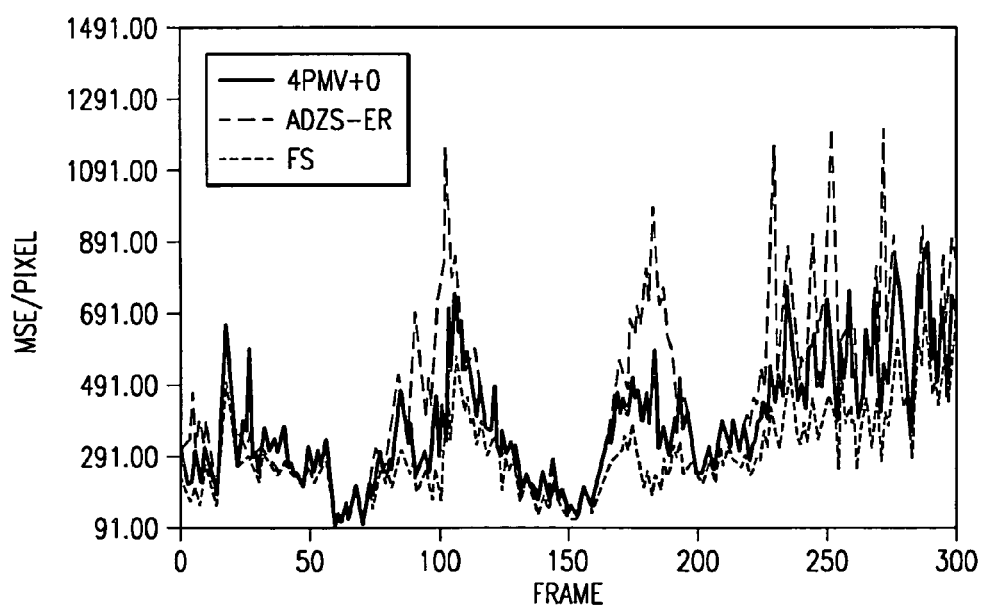
FIG. 23 is a graph.

FIG. 20 shows the CBs for the object "Fish" in the sequence "Bream". It can be seen that the present method not only requires fewer check blocks, but is also more robust compared to ADSZ-ER. Due to its adaptivity, the number of check blocks is not affected by changes in the amount of motion as much as ADSZ-ER. In case of complex video objects, such as "Stefan", which contain a high proportion of uncorrelated blocks and fast motion, the present method still requires the lowest number of check blocks and performs very competitively in terms of MSE.

Insofar as embodiments of the invention described above are implementable, at least in part, using a software-controlled programmable processing device such as a Digital Signal Processor, microprocessor, other processing devices, data processing apparatus or computer system, it will be appreciated that a computer program for configuring a programmable device, apparatus or system to implement the foregoing described methods is envisaged as an aspect of the present invention. The computer program may be embodied as source code and undergo compilation for implementation on a processing device, apparatus or system, or may be embodied as object code, for example. The skilled person would readily understand that the term computer in its most general sense encompasses programmable devices such as referred to above, and data processing apparatus and computer systems.

Suitably, the computer program is stored on a carrier medium in machine or device readable form, for example in solid-state memory or magnetic memory such as disc or tape and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

In view of the foregoing description it will be evident to a person skilled in the art that various modifications may be made within the scope of the invention. In particular, the method may be applied to frame-based coding as well as object-based coding.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for estimating a motion vector for encoding video, comprising:
    selecting a prediction motion vector for a current block of a current image frame from motion vectors of a plurality of neighbor blocks of said current block having a minimum block distortion measure between the neighbor block displaced by the corresponding motion vector and corresponding pixels of a prior image frame; and
    checking whether a predetermined criterion $MBDM_{neighbor}(PMV)BDM_{current}(PMV)|<Threshold$ is satisfied, where: PMV is the selected prediction motion vector; $BDM_{current}$ (PMV) is the block distortion measure of said current block with a block in said previous image frame displaced by said selected prediction motion vector; $MBDM_{neighbor}$ (PMV) is said minimum block distortion measure of said neighbor block with a block in said previous image frame displaced by said corresponding motion vector; and Threshold is a predetermined constant;
    if said predetermined criterion is satisfied, then assigning said selected prediction motion vector as estimated motion vector to said current block; and
    if said predetermined criterion is not satisfied, then
        calculating a block distortion measure for the current block at four additional displacements consisting of said selected prediction motion vector displaced up one pixel, said selected prediction motion vector displaced down one pixel, said selected prediction motion vector displaced left one pixel, said selected prediction motion vector displaced right one pixel, and
        if said block distortion measure for the current block displaced by said selected prediction motion vector is less than said block distortion measure for the current block at said four additional displacements, then assigning said selected prediction motion vector as estimated motion vector to said current block.

2. The method according to claim 1, wherein:
    said plurality of neighbor blocks include three adjacent blocks in a prior row of blocks and an immediately prior block in a current row of blocks.

3. The method according to claim 1, wherein:
    said step of calculating a block distortion measure for the current block at four additional displacements aborts calculation for a particular additional displacement if a running sum exceeds said block distortion measure for the current block displaced by said selected prediction motion vector or a previously calculated block distortion measure for another of said additional displacements.

4. A method according to claim 1, wherein:
    if said block distortion measure for the current block displaced by said selected prediction motion vector is greater than said block distortion measure for the current block at any of said four additional displacements, then
    selecting as modified prediction motion vector a motion vector of the four additional displacements having a minimum block distortion measure,
    calculating a block distortion measure for the current block at four further additional displacements consisting of said modified prediction motion vector displaced up one pixel, said modified prediction motion vector displaced down one pixel, said modified prediction motion vector displaced left one pixel, said modified prediction motion vector displaced right one pixel,
    if said block distortion measure for the current block displaced by said modified prediction motion vector is less than said block distortion measure for the current block at said four further additional displacements, then calculating a block distortion measure for the current block at displacements at adjacent pixels to said modified prediction motion vector not previously calculated and assigning as estimated motion vector to said current block a motion vector among said modified prediction motion vector and at displacements at adjacent pixels having a minimum block distortion measure.

5. The method according to claim 4, wherein:
    said step of calculating a block distortion measure for the current block at four further additional displacements aborts calculation for a particular further additional displacement if a running sum exceeds said block distortion measure for the current block displaced by said modified prediction motion vector or a previously calculated block distortion measure for another of said further additional displacements.

6. A method according to claim 5, wherein:
    if said block distortion measure for the current block displaced by said modified prediction motion vector is greater than said block distortion measure for the current block at any of said four further additional displacements, then
    selecting as modified prediction motion vector a motion vector of the four further additional displacements having a minimum block distortion measure,
    calculating a block distortion measure for the current block at four additional displacements consisting of said modified prediction motion vector displaced up two pixels, said selected prediction motion vector displaced down two pixels, said selected prediction motion vector displaced left two pixels, said selected prediction motion vector displaced right two pixels, if said block distortion measure for the current block displaced by said modified prediction motion vector is less than said block distortion measure for the current block at said four additional displacements, then calculating a block distortion measure for the current block at displacements at adjacent pixels to said modified prediction motion vector not previously calculated and assigning as estimated motion vector to said current block a motion vector among said modified prediction motion vector and at displacements at adjacent pixels having a minimum block distortion measure, else repeating said selecting and calculating steps until said block distortion measure for the current block displaced by said modified prediction motion vector is less than said block distortion measure for the current block at said four additional displacements.

7. The method according to claim 6, wherein:

said step of calculating a block distortion measure for the current block at four further additional displacements aborts calculation for a particular further additional displacement if a running sum exceeds said block distortion measure for the current block displaced by said modified prediction motion vector or a previously calculated block distortion measure for another of said further additional displacements; and said step of calculating a block distortion measure for the current block at displacements at adjacent pixels to said modified prediction motion vector not previously calculated aborts calculation for a particular adjacent pixel if a running sum exceeds said block distortion measure for the current block displaced by said modified prediction motion vector or a previously calculated block distortion measure for another of said adjacent pixels.

* * * * *